(12) United States Patent  (10) Patent No.: US 7,252,441 B2
Chapman  (45) Date of Patent: Aug. 7, 2007

(54) TELESCOPING CAMERA CRANE

(75) Inventor: Leonard T. Chapman, North Hollywood, CA (US)

(73) Assignee: Chapman/Leonard Studio Equipment, North Hollywood, CA (US)

( * ) Notice: Subject to any disclaimer, the term of this patent is extended or adjusted under 35 U.S.C. 154(b) by 0 days.

(21) Appl. No.: 11/555,124

(22) Filed: Oct. 31, 2006

(65) Prior Publication Data

US 2007/0058968 A1    Mar. 15, 2007

Related U.S. Application Data

(60) Division of application No. 10/934,804, filed on Sep. 3, 2004, now Pat. No. 7,128,479, which is a continuation-in-part of application No. 10/791,118, filed on Mar. 1, 2004, now Pat. No. 7,121,745.

(51) Int. Cl.
  *G03B 17/00*  (2006.01)
  *F16M 11/00*  (2006.01)
  *B66C 23/42*  (2006.01)
  *B66C 23/76*  (2006.01)

(52) U.S. Cl. .................. 396/428; 248/123.2; 212/198; 212/296

(58) Field of Classification Search ................ 396/419, 396/428; 352/243; 248/123.2; 212/195–198, 212/296
  See application file for complete search history.

(56) References Cited

U.S. PATENT DOCUMENTS 2,156,862 A    5/1939   Maugard
2,472,944 A    6/1949   Furer et al.
4,657,220 A    4/1987   Lindsay
4,907,768 A    3/1990   Masseron et al.
4,943,019 A    7/1990   Mester
4,952,953 A    8/1990   Ridderstolpe et al.
5,697,757 A   12/1997   Lindsay
5,768,648 A    6/1998   Skipp et al.
5,781,814 A    7/1998   Chapman
5,856,862 A    1/1999   Kokush
6,450,706 B1   9/2002   Chapman
6,478,427 B1 * 11/2002  Morris et al. ................ 352/243
6,752,541 B1 * 6/2004   Dykyj .......................... 396/428

(Continued)

FOREIGN PATENT DOCUMENTS

DE    3628782 A1    3/1998
JP    08-068493     3/1996

OTHER PUBLICATIONS

Techno Crane Brochure (Sep. 1986).

(Continued)

*Primary Examiner*—W. B. Perkey
(74) *Attorney, Agent, or Firm*—Perkins Coie LLP

(57) ABSTRACT

A telescoping camera crane has mechanical drive and camera platform leveling systems, allowing for water resistant or submerged operation. Telescoping sections of the crane arm are driven by a hydraulic system, for smooth and near silent extension and retraction movement. The telescoping sections of the crane arm have a slight upward curvature, to compensate for deflection the arm, thereby improving performance. Electronic and mechanical stopping systems allow the camera platform to be smoothly, accurately, and reliably positioned. Camera platform levelling and stabilizing systems keep the camera level.

9 Claims, 28 Drawing Sheets

U.S. PATENT DOCUMENTS 6,776,488 B2    8/2004   Burbulla
2003/0076480 A1  4/2003   Burbulla

OTHER PUBLICATIONS

Super Techno Crane Brochure (Sep. 1986).

U.S. Patent Office; International Search Report for PCT/US05/06491 dated Aug. 11, 2005.

U.S. Patent Office; Written Opinion of the International Searching Authority for PCT/US05/06491 dated Aug. 11, 2005.

* cited by examiner

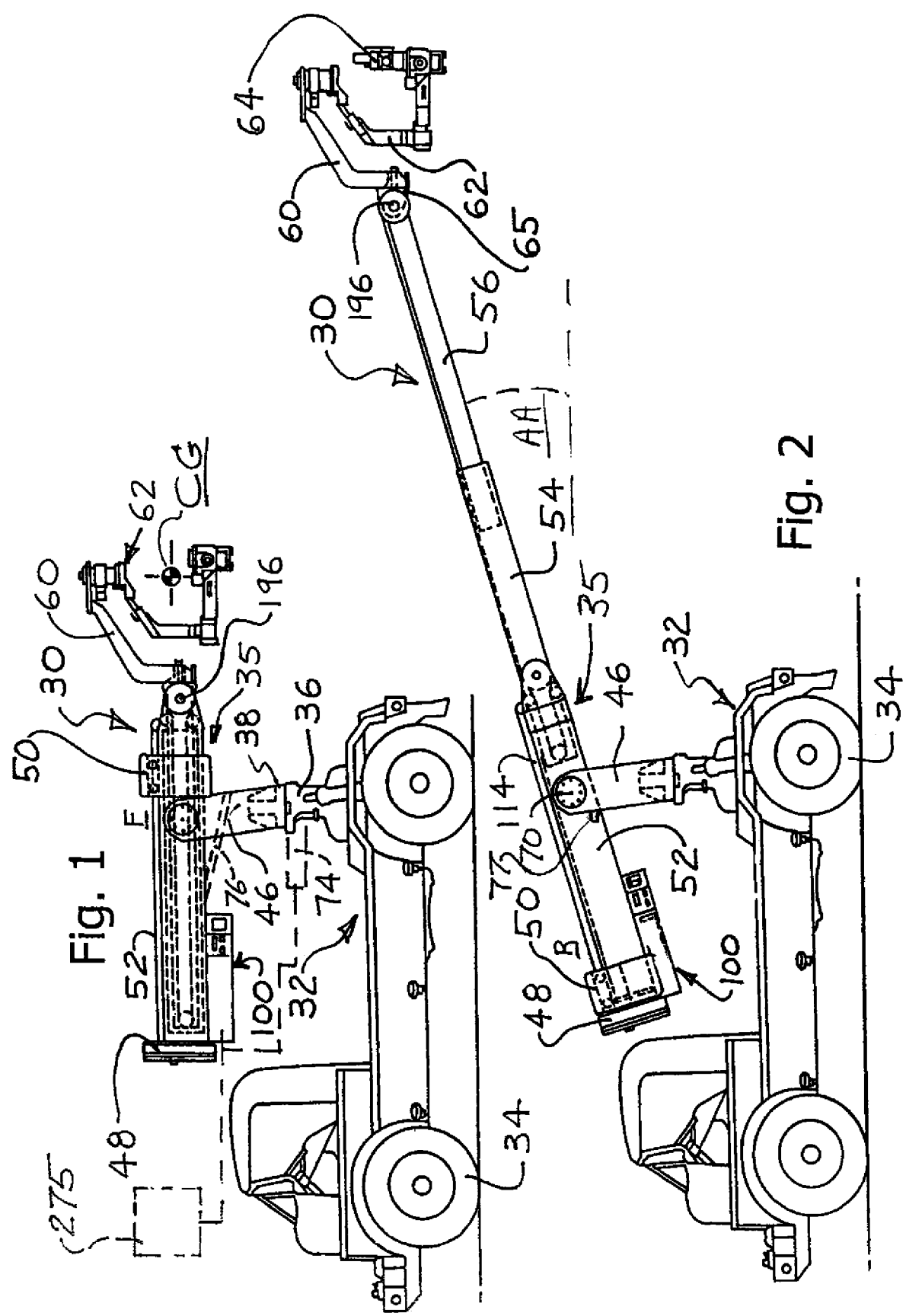

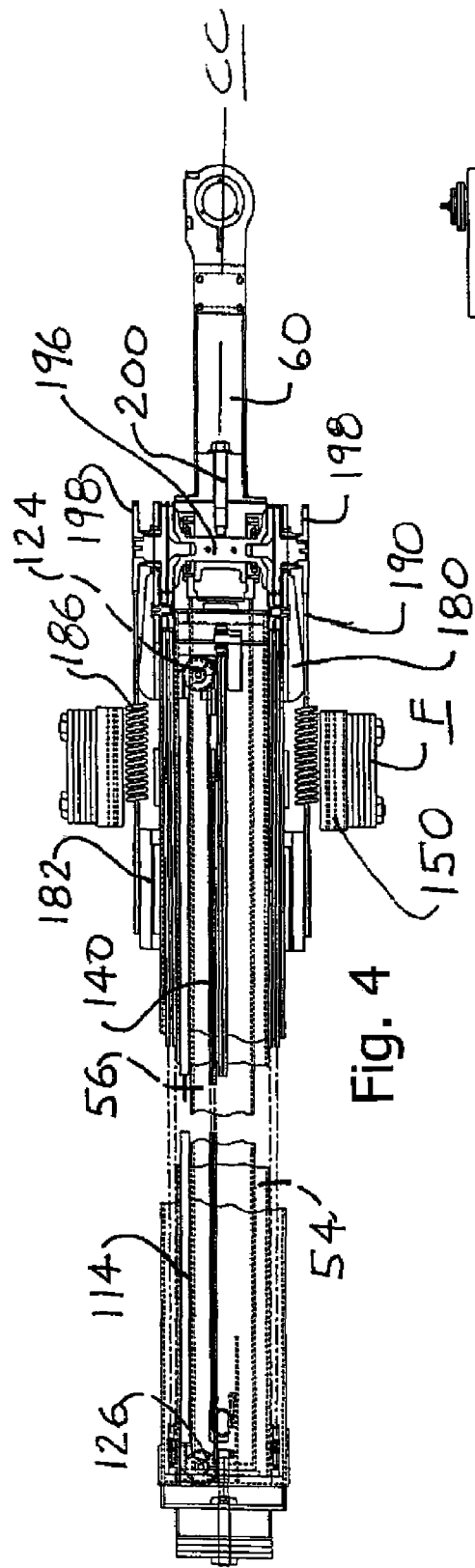
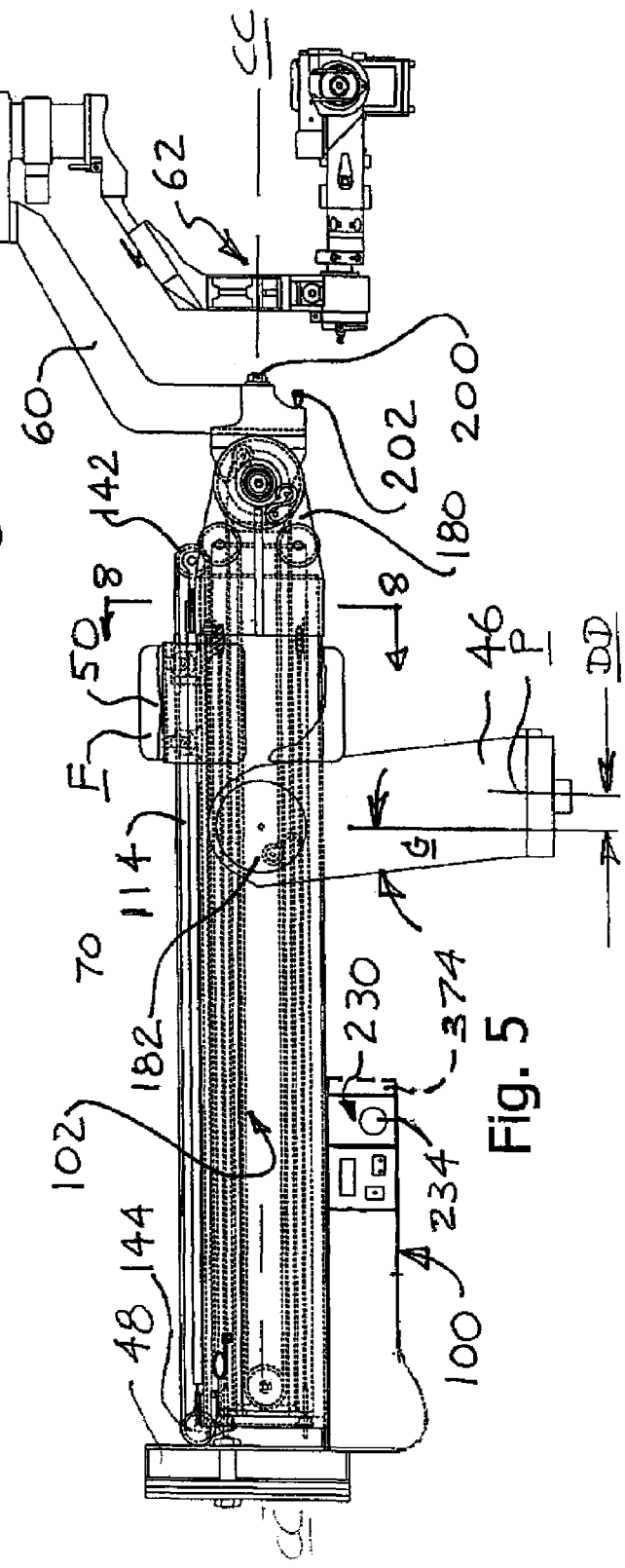
Fig. 4
Fig. 5

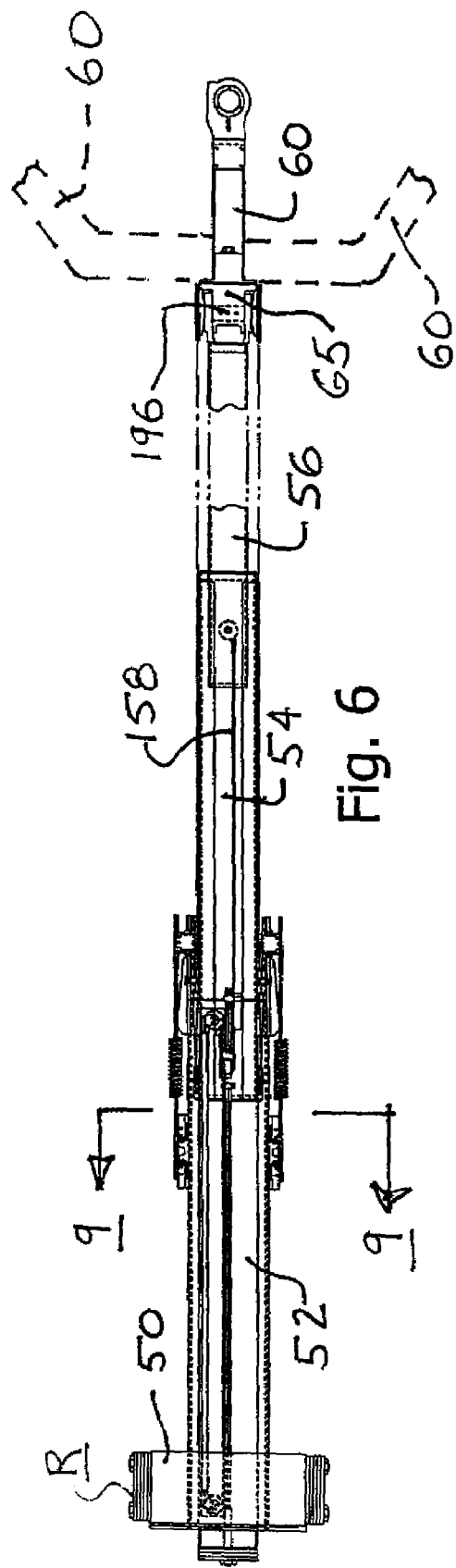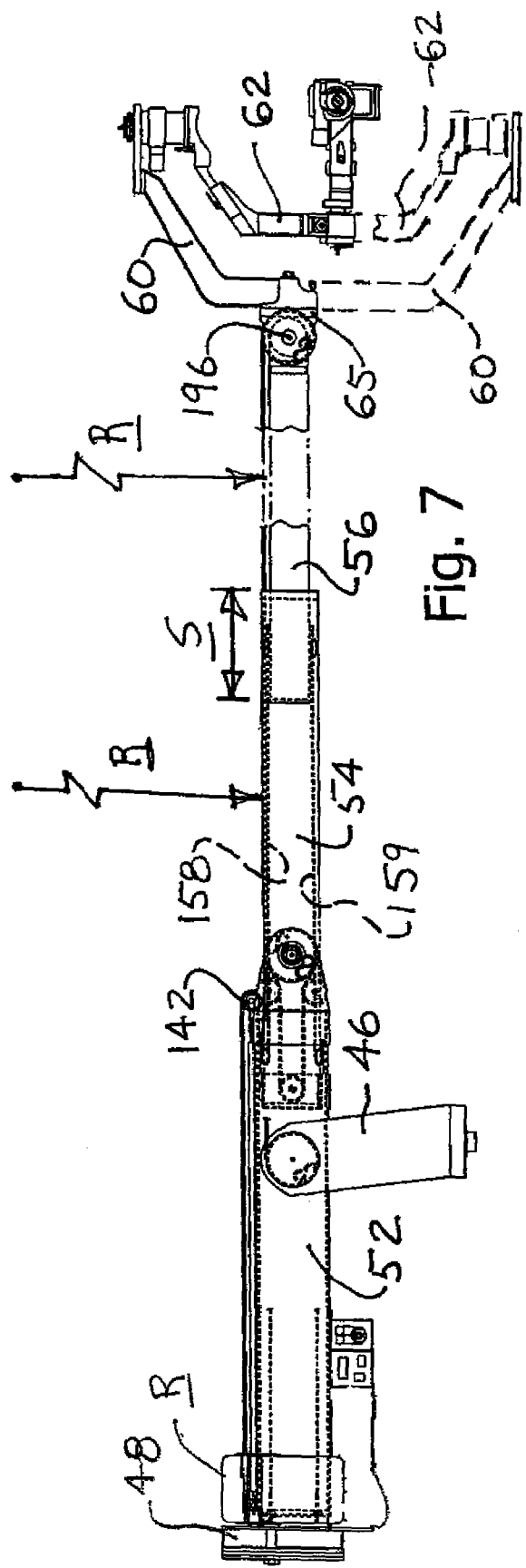

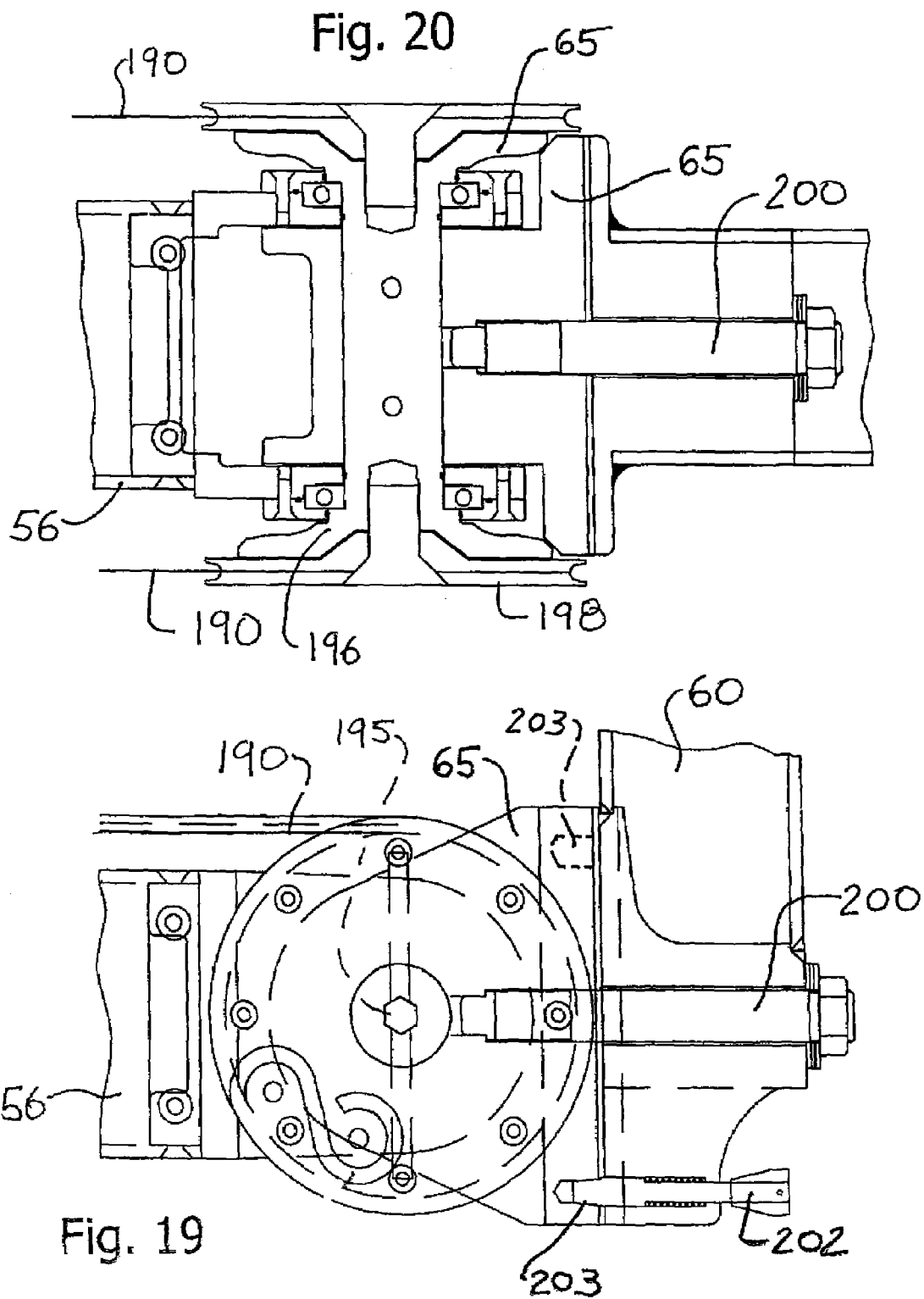

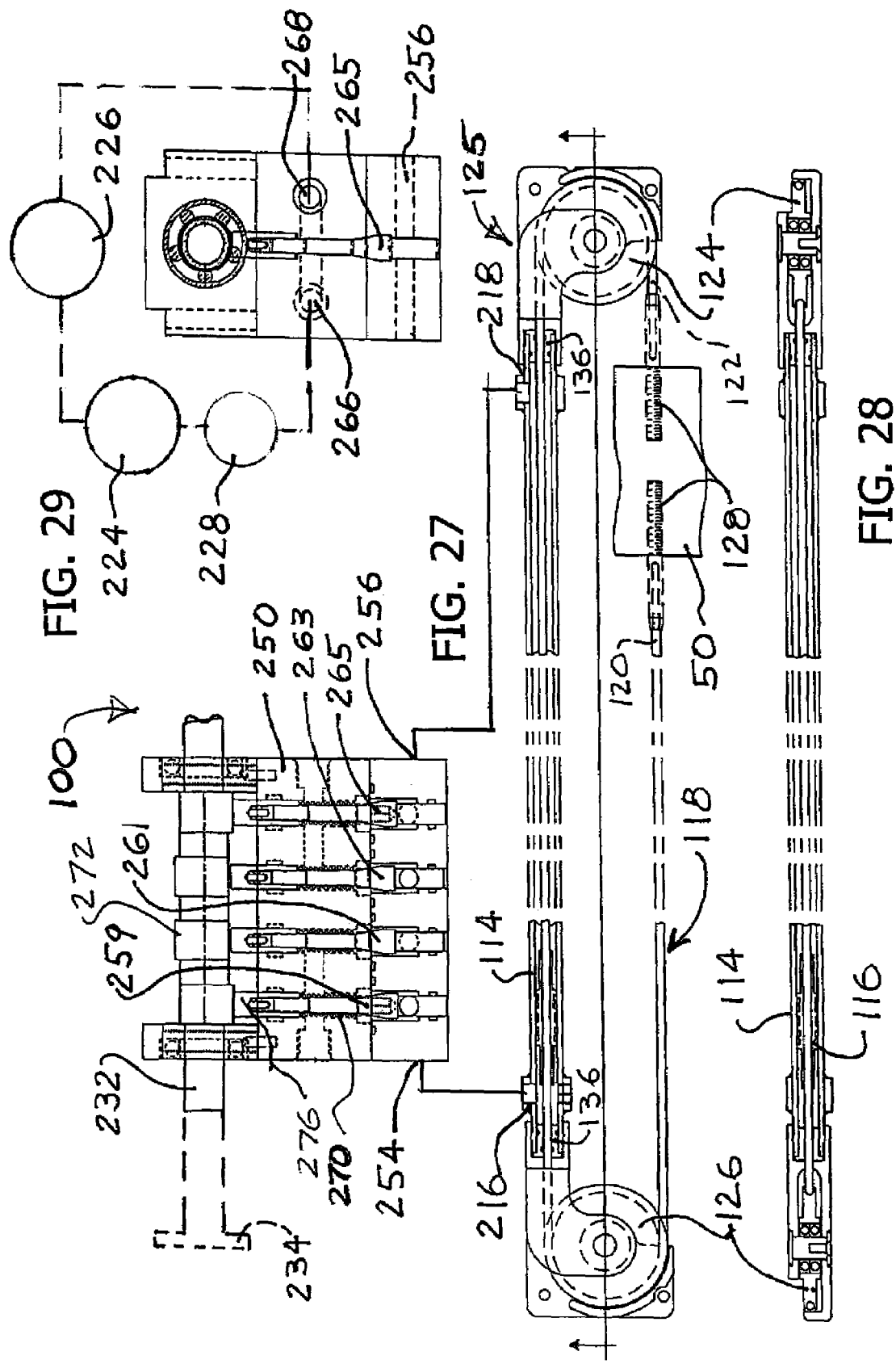

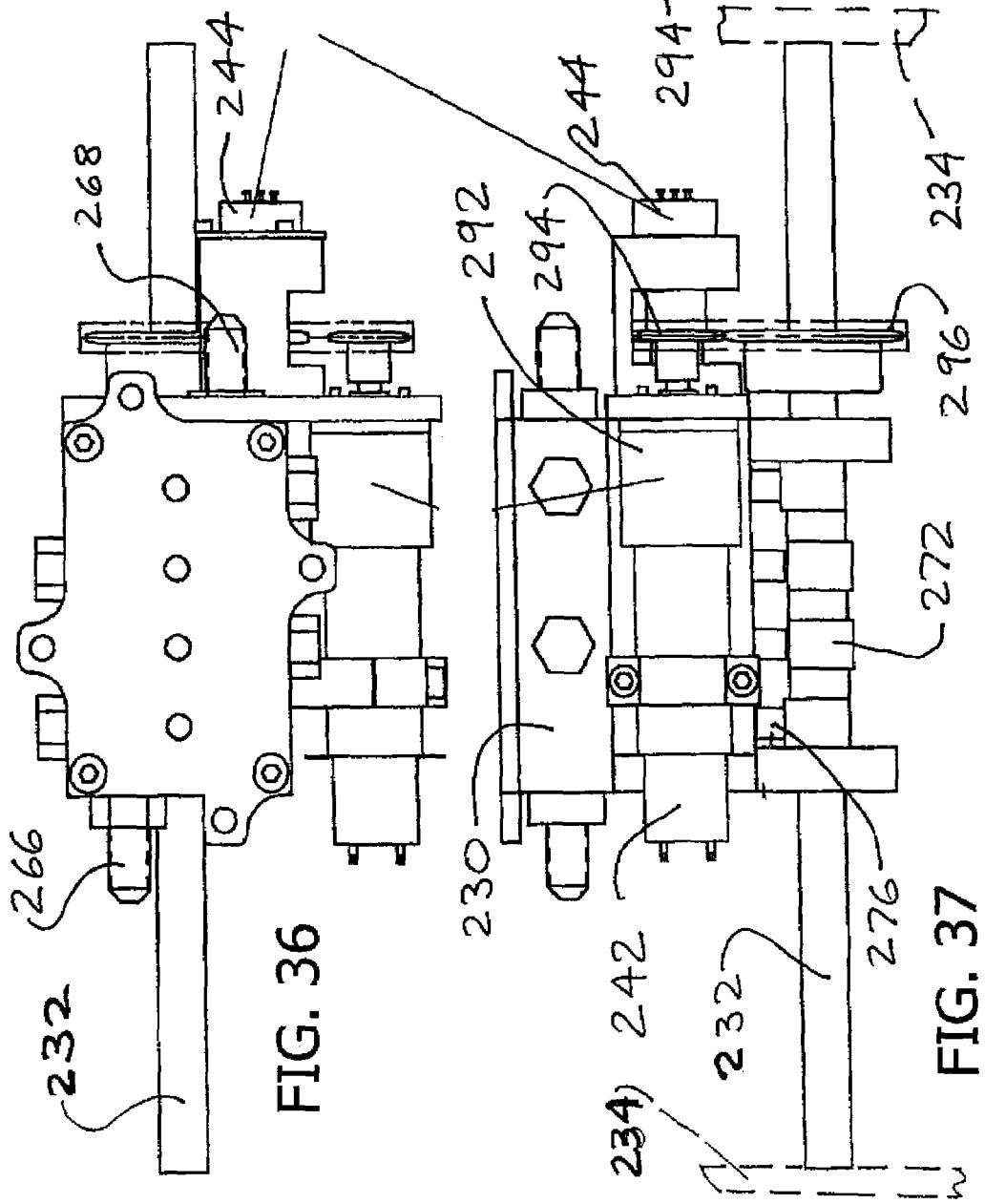

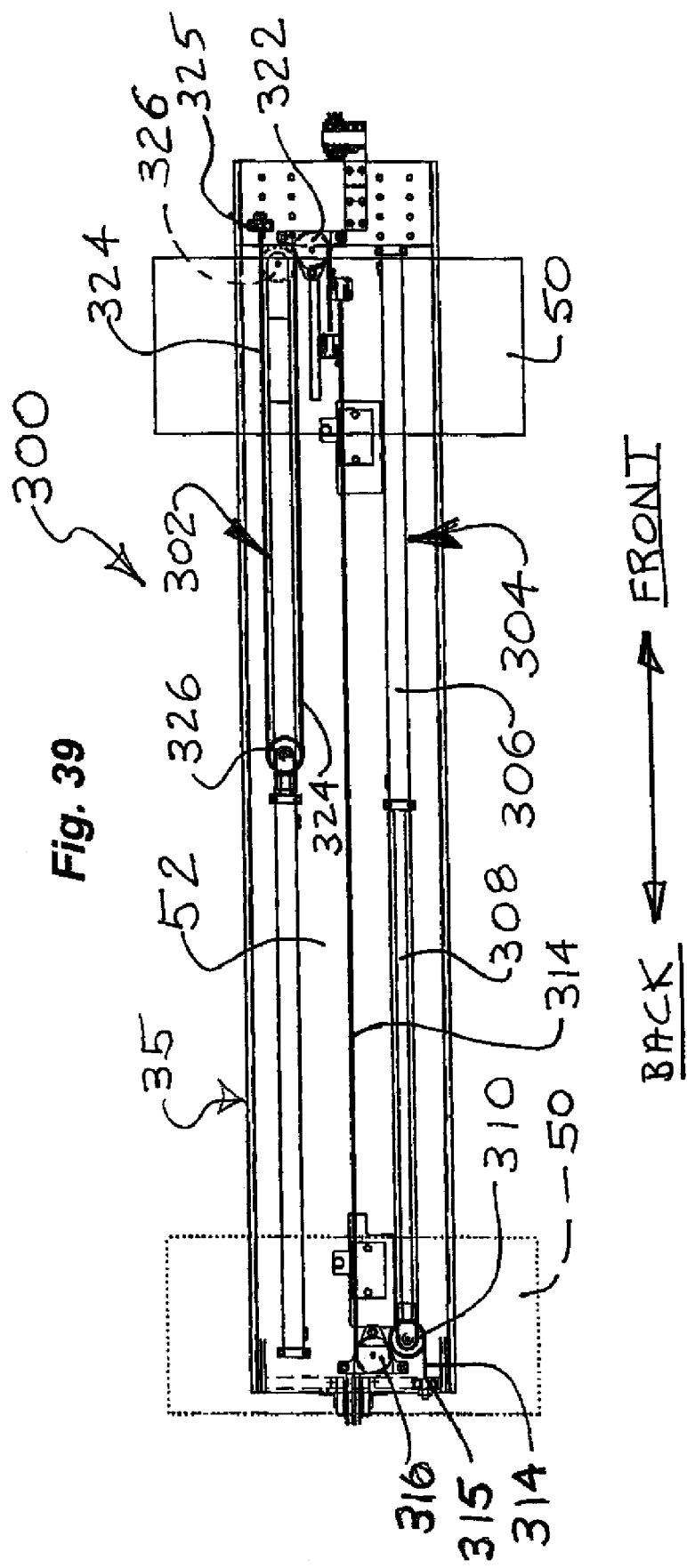

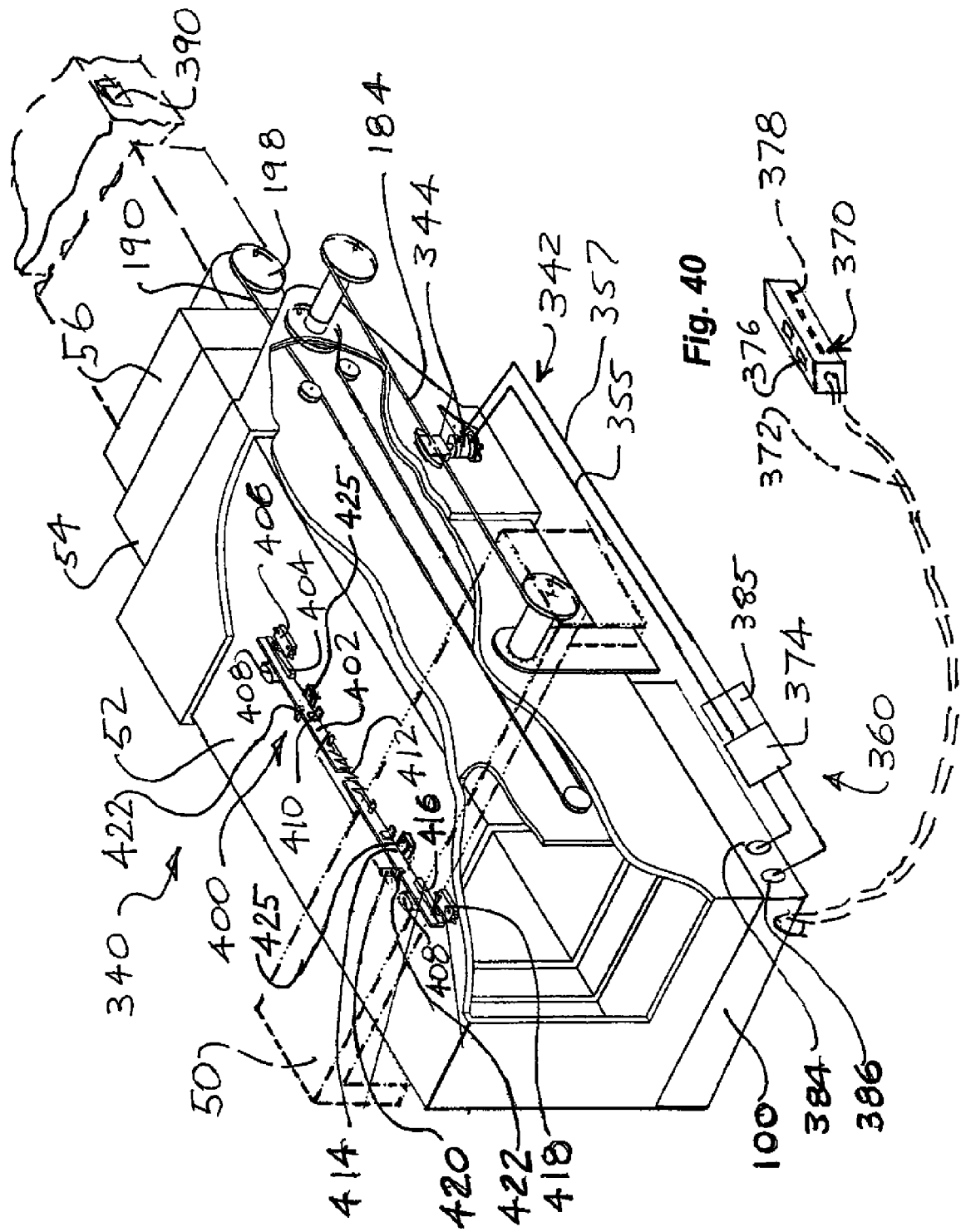

TELESCOPING CAMERA CRANE

CROSS-REFERENCE TO RELATED APPLICATIONS

This application is a Divisional of U.S. patent application Ser. No. 10/934,804, filed Sep. 3, 2004, now U.S. Pat. No. 7,128,479, which is a Continuation-in-Part of U.S. patent application Ser. No. 10/791,118, filed Mar. 1, 2004, now U.S. Pat. No. 7,121,745. Both of these applications are incorporated herein by reference.

BACKGROUND OF INVENTION

The field of the invention is camera cranes.

Camera cranes are often used in motion picture and television production. The motion picture or television camera is typically mounted on a crane arm supported on a mobile base, dolly, or truck. The mobile base may be pushed and steered by hand. Larger units, which have more weight carrying capacity, and longer reaches, typically have electric driving motors powered by onboard batteries. Some mobile bases also including conventional gasoline or diesel engines, may also serve as over the road vehicles.

Camera cranes generally have a crane arm supported on a base, with a camera platform at one end of the arm, and a counter weight at the other end. The crane arm can be pivoted by hand to raise and lower the camera, and also to pan to the left or right side. A leveling system is often included to maintain the camera platform in a level orientation, as the elevation angle of the arm changes. Some mobile bases may include a self leveling or an extendible center post or column, which the crane arm can be mounted on.

With the development of high definition digital television cameras, and remote controlled motion picture cameras, filming can be achieved without a camera operator behind the camera. Rather, the remotely-controlled camera may be suspended on a crane arm, with the camera operator monitoring the image captured by the camera via a remote monitor.

Due to the variety of filming or video locations, the camera crane arm should advantageously be portable and lightweight. On the other hand, the arm must be rigid enough, when assembled, to resist bending and sagging, and to avoid excessive whipping motion of the camera during crane arm movement. Most camera cranes are made up from modular segments or sections, and have a fixed length. The segments are joined together until an arm of desired length is formed. With these types of arms, the length can be changed only by adding or removing segments. This is a time consuming process, as segments and leveling arms are bolted into place or removed. In addition, each time the length of the arm is changed, the arm must be rebalanced, by adding or removing counter weights. More importantly, crane arms having a fixed length cannot achieve various camera movements.

As a result, telescoping camera cranes have been developed. These types of cranes have a telescoping arm that can extend and retract. This allows for a much broader range of camera movement. While existing telescoping camera cranes have had varying degrees of success, existing designs have several disadvantages. Generally, the telescoping camera cranes available now use various electrical systems. Consequently, these cranes tend to have performance problems if used in rain or wet conditions. Attempts to avoid or reduce these problems by wrapping or tenting the electrical components provide mixed results. Of course, these types of cranes also cannot be used underwater. In addition, these types of cranes tend to be very large, heavy, and bulky. This makes transportation and set up time consuming and difficult. As production time is usually extremely expensive, time saving features are highly significant.

Moreover, under certain conditions, these types of telescoping cranes can cause unintended or undesirable camera movements, due to bending, flexing, twisting, or vibration of the crane arm. Noise generated from moving parts in these types of cranes, when the arm is extended or retracted, can also disrupt filming or recording.

Accordingly, various engineering challenges remain in designing an improved camera crane.

SUMMARY OF THE INVENTION

After extensive research and development by the inventor, a novel telescoping camera crane is provided with various new features and advantages. In a first aspect, the camera crane has mechanical drive and camera platform leveling systems. Consequently, the camera crane is essentially waterproof. While waterproof or water resistant enclosures have been made for cameras, until now, little or no such parallel developments have been made for camera cranes. Now, however, with the inventor's new crane, previously unknown and dramatic camera movements and angles can be achieved. For example, using the present crane, the camera can move down toward a water surface, and then pass through the water surface into a submerged position, in a single continuous movement, and without moving the mobile base, vehicle or dolly supporting the crane. In another example, the camera can approach, and move directly through a waterfall, in a continuous movement, with no movement of the mobile base required.

In a second and separate or independent aspect, the telescoping sections of the present crane are driven by a novel hydraulic system. This provides exceptionally smooth and near silent extension and retraction movement. This movement can also be precisely controlled. The hydraulic system includes a pair of hydraulic cylinders which alternately pull on cables, to extend and retract telescoping crane sections. This system is highly compact, efficient, and waterproof.

In a third aspect, novel stop position systems are provided. In one stop system, stopping positions are set via an electronic control. In another stop system, valves are actuated directly by a component attached to and moving with an arm section. These systems allow for highly reliable, repeatable and accurate camera positioning.

In another aspect, a camera platform levelling system uses cables to maintain the camera platform in a level position, as the crane arm pivots up or down in elevation. A cable tensioning or camera platform stabilizing system automatically compensates for backlash or stretching of the cables. This allows the levelling system to constantly keep the camera platform level.

Other aspects and advantages will be apparent from the following detailed description and drawings. The invention relies as well in subcombinations and subsystems of the elements described. For example, each of the features listed above can be used as an improvement in a conventional crane design. Alternatively, they may be used in various combinations with each other.

BRIEF DESCRIPTION OF THE DRAWINGS

In the drawings, wherein the same reference number indicates the same element in each of the views:

FIG. 1 is a side view of a novel telescoping crane, mounted on a mobile base or vehicle, with the crane in the retracted position.

FIG. 2 is a side view of the crane shown in FIG. 1, with the arm now fully extended.

FIG. 4 is a plan view of the crane arm shown in FIG. 1.

FIG. 5 is an enlarged side view of the crane arm shown in FIG. 1.

FIG. 6 is a plan view of the present crane arm in the fully extended position.

FIG. 7 is a side view thereof.

FIG. 19 is an enlarged side view, in part section, of the nose plate of the present crane arm.

FIG. 20 is a plan view thereof.

FIG. 27 is a schematic diagram of the hydraulic cylinder shown in FIGS. 3 and 10 connected to a hydraulic control valve.

FIG. 28 is a side view of the hydraulic cylinder shown in FIG. 27.

FIG. 29 is a schematic diagram showing connections of the control valve to other hydraulic components.

FIG. 36 is a top view of the motor and valve assembly shown in FIG. 30.

FIG. 37 is a front view thereof.

FIG. 38 is a side view thereof.

FIG. 39 is a top view of a telescoping crane having an alternative drive system.

FIG. 40 is a schematic perspective of an alternative telescoping crane having a mechanical stopping position system, and automatic camera platform stabilizing or leveling systems.

DETAILED DESCRIPTION OF THE DRAWINGS

Figure 3:
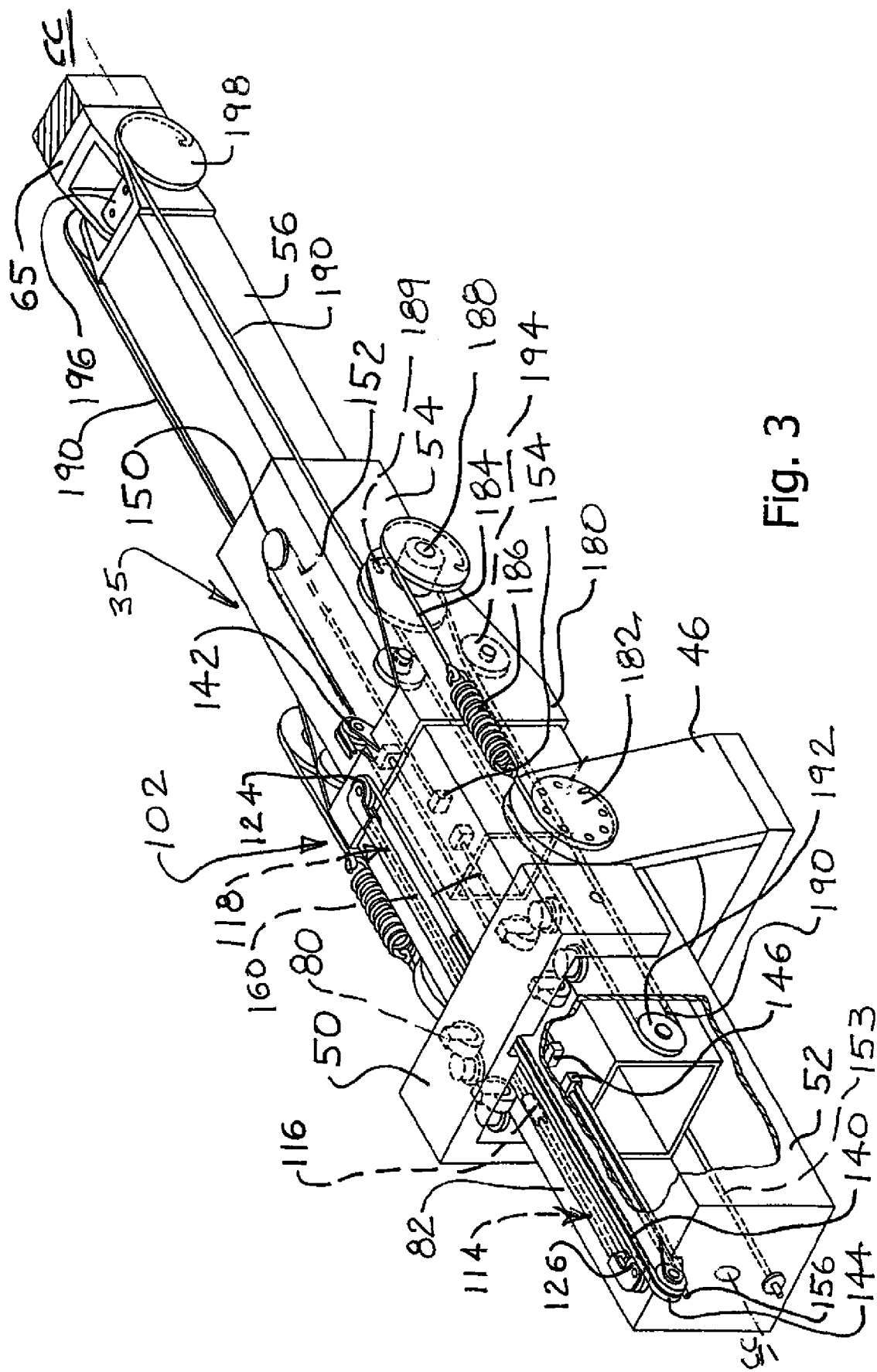
FIG. 3 is a partial perspective view showing various components of the crane arm shown in FIGS. 1 and 2.

Turning now in detail to the drawings, as shown in FIGS. 1 and 2, a telescoping crane 30 is mounted onto a mobile base 32. The mobile base 32 may be a truck or road vehicle, or a motorized special purpose camera crane base or dolly. Typically, the mobile base 32 will have wheels 34 which drive and steer the mobile base. Four-wheel drive and four-wheel steering may be provided. For smaller scale cranes 30, e.g., up to about 15 feet, the mobile base 32 may be unmotorized, and may be moved or pushed by hand. For larger versions of the telescoping crane 30, or when required due to ground conditions or other use requirements, the mobile base 32 can have electric motors, or internal combustion engines, for driving the wheels 34.

As shown in FIGS. 1 and 2, the crane 30 is mounted on a column 36 on the mobile base 32. The column 36 may be automatically leveled, as described in U.S. Pat. No. 4,747,424, incorporated herein by reference, to maintain the crane 36 in a level orientation as the mobile base 32 moves over uneven ground.

Figure 8:
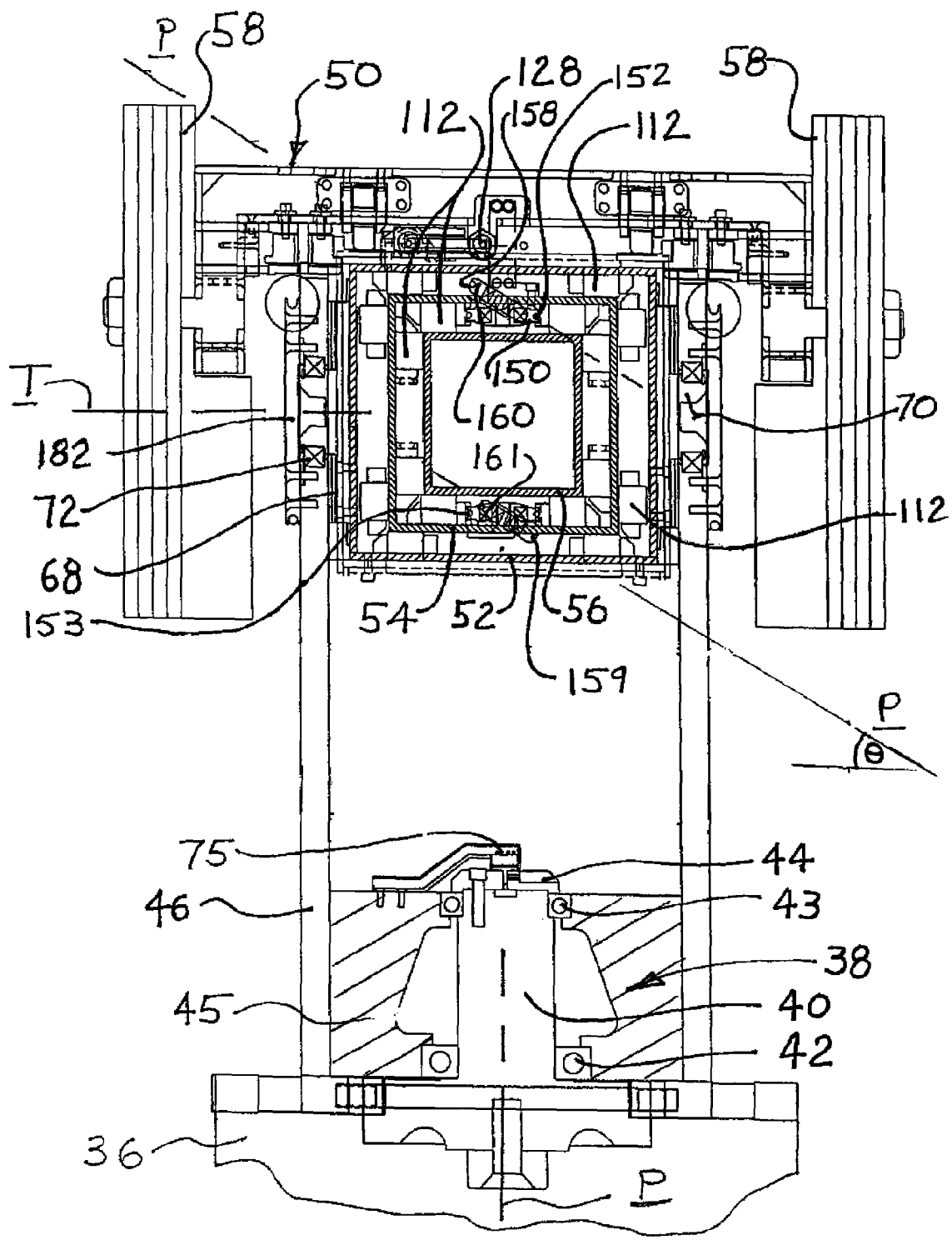
FIG. 8 is a partial section view taken along line 8-8 of FIG. 5.

A U-shaped center post 46 is rotatably mounted on the column 36. As shown in FIG. 8, a post 40 on the column 36 extends up through a lower column bearing 42, and upper column bearing 43 secured within a post ring 45 of the center post 46. A cap nut 44 is attached, e.g., threaded, onto the top end of the column post 40, to securely attach the center post 46 onto the column 36 of the mobile base 32, while still allowing the center post 46 of the crane 30 to rotate. As shown in FIG. 5, the centerpost 46 extends up at a rearward angle G, so that the tilt axle 70 is offset behind the pan axis P by a distance DD. This offset, which helps to keep the center of gravity of the arm 35 centered over the pan axis bearings 42 and 43, varies with the arm design, and typically is 1-3 inches. The corresponding angle G is generally 5-15 degrees. An optional potentiometer or angular position sensor 75 has a base attached to the fixed or non-rotating column post 40, and a body linked to and rotatable with the center post 46, to provide an electrical output signal to a controller, such as a control box 275 shown in FIG. 1.

Referring back to FIGS. 2, and 8, a crane arm 35 is supported on a tilt axle 70 which is pivotably supported on the center post 46. Consequently, the crane arm 35 can rotate about a pan axis P, and can also pivot about a tilt axis T shown in FIG. 8.

Referring to FIGS. 1-11, the crane arm 35 includes a first or outer section 52, a second or middle section 54, and a third or inner section 56. As shown in FIG. 8, the first section 52 is supported on the tilt axle 70 via an axle bearing 72. Fixed or non-moving trim weights 48 are placed at the back end of the first section 52. The trim weights 48 may or may not be needed or used, depending on whether non-moving weight from e.g., accessories, is added to the arm in front of the tilt axle.

Figure 9:
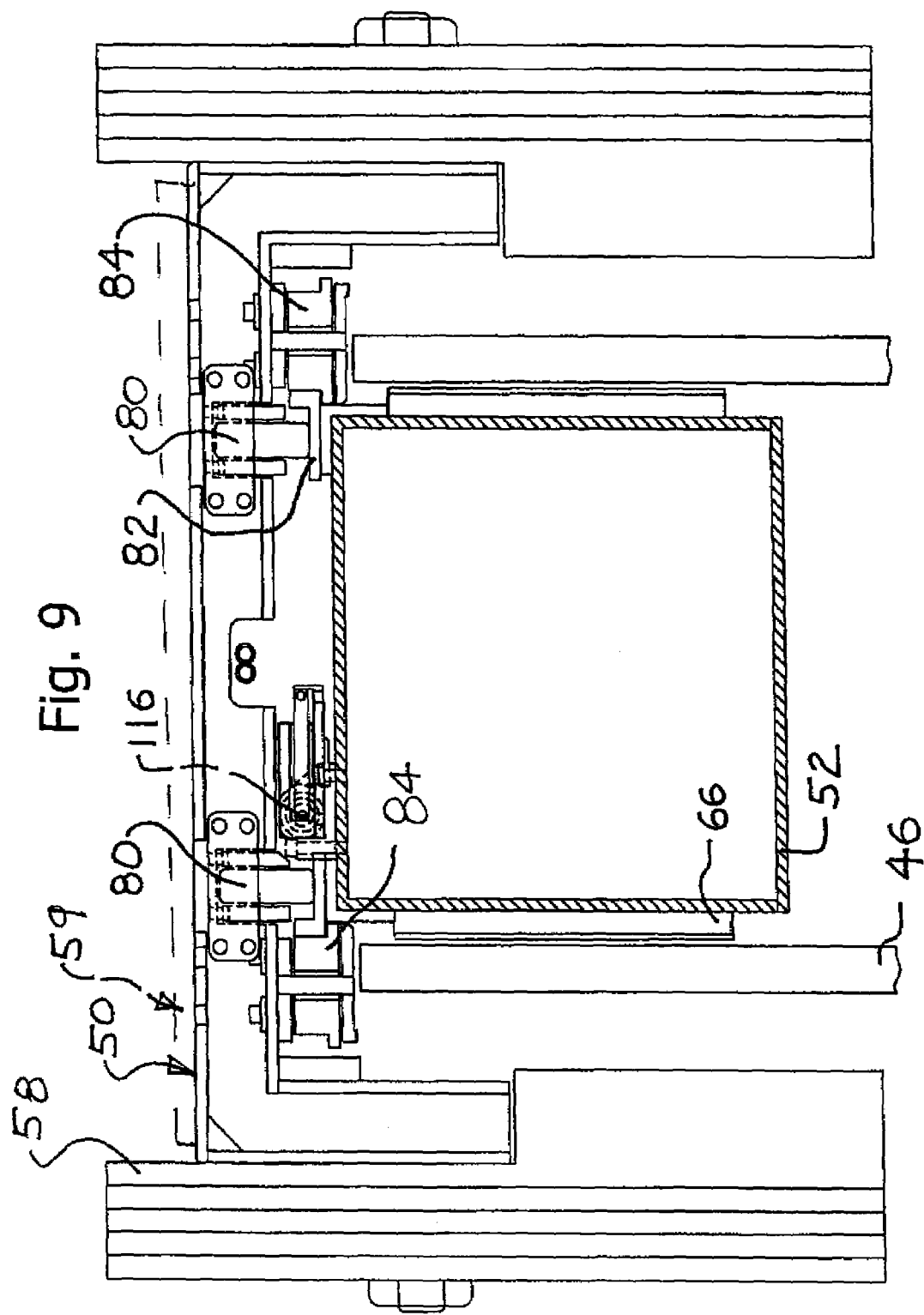
FIG. 9 is a section view taken along line 9-9 of FIG. 6.
Figure 10:
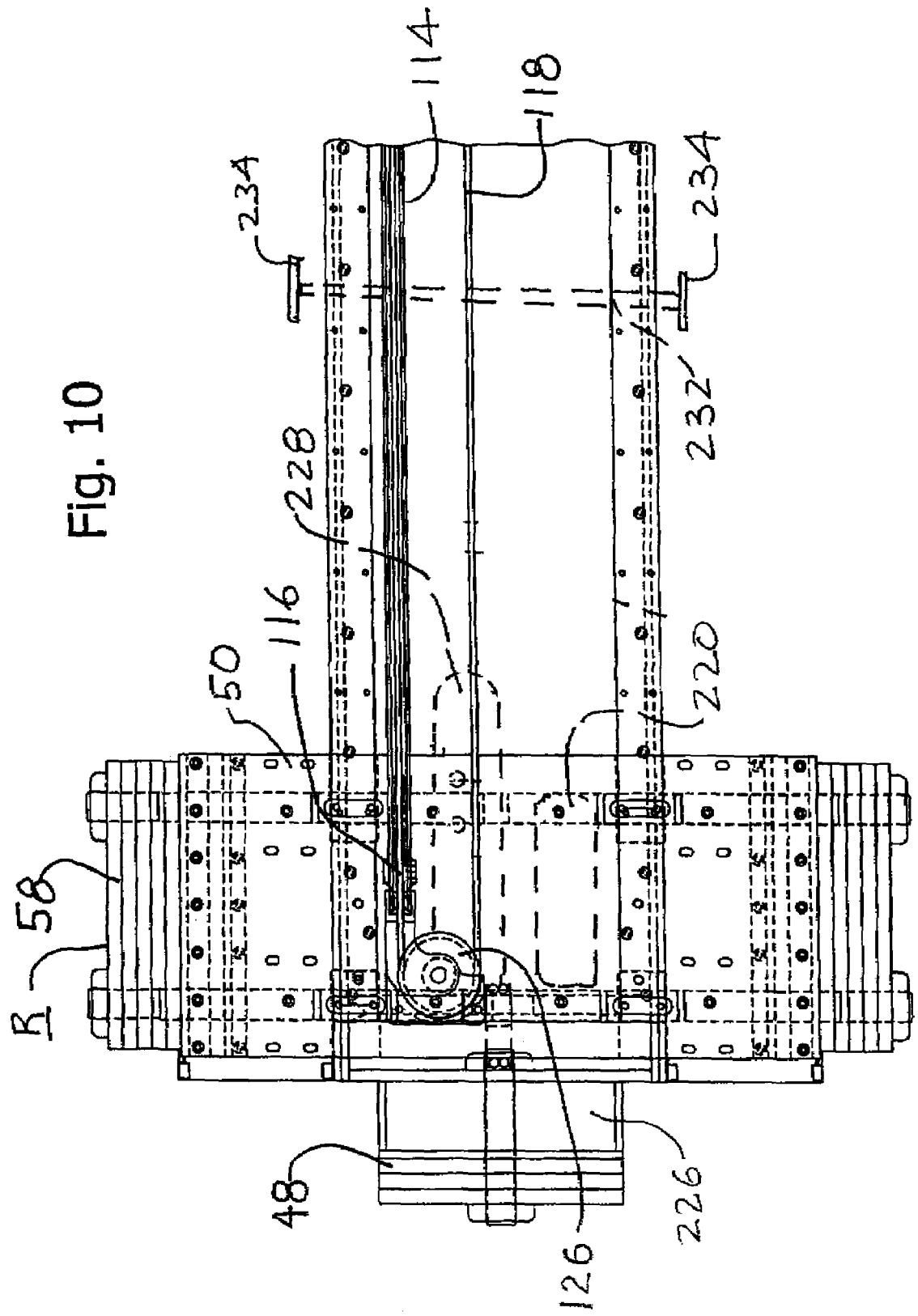
FIG. 10 is a partial plan view of the back end of the crane arm shown in FIGS. 3-7.

A counter weight carrier or tray 50 is movable along the top of the first section 52, from a front or forward position F, when the arm 35 is fully retracted, as shown in FIGS. 1, 4, and 5, to a rear or back position R, when the arm 35 is fully extended, as shown in FIGS. 2, 6, and 7. Moving or mobile counter weights 58 are attached to the counter weight carrier 50. As shown in FIGS. 3, 8, and 9, the counter weight carrier 50 has top rollers or wheels 80 which roll on a roller track 82 attached to the top surface of the first section 52. The counter weight carrier 50 also has side rollers or wheels 84 which roll along the sides of the roller track 82. The top rollers 80 support the weight of the counter weight carrier 50 and moving counter weights 58, and allow the counter weight carrier 50 to roll between the front and rear positions with low force. The side rollers 84 keep the counter weight carrier 50 aligned, side to side, on top of the first section 52, and secure the counter weight carrier vertically against upward movement.

Referring to FIGS. 2, 6, 7, 16, 17, 19, and 20, a nose plate 65 is attached to a nose axle 196 pivotably attached at the front end of the third section 56. A riser or extension 60 can be attached to the nose plate 65 with a mounting bolt 200 and a quick release position pin 202.

In the configuration shown, an extension 60 is used, and a remote camera head 62 is attached at the front end of the extension 60. The camera head 62 is described in U.S. patent application Ser. No. 10/782,034 incorporated herein by reference. Of course, other camera heads may also be used. Alternatively, other camera support plates, risers, drop downs or accessories may be attached directly to the nose plate 65, with no extension 60 and/or camera head 62 being used. In the configuration shown, a camera 64 is attached to a camera platform on the camera head 62. The camera head 62, if used, can provide controlled angular camera movement about pan, tilt, and roll axes, independent of movement of the crane arm 35. Referring to FIG. 19, the nose plate 65 has four or more preferably equally radially spaced apart positioning holes 203. The extension 60 and camera head 62 can be moved from the upright or overslung position, shown in solid lines in the drawings, to an inverted or underslung position, as shown in dotted lines in FIG. 7, or to a 90 degree position, as shown in dotted lines in FIG. 6, by loosening the mounting bolt 200, withdrawing the spring-based position pin 202, then turning the extension 60 to the desired position, releasing the position pin 202, and retightening the bolt 200. These alternate positions provide added range of camera movement. In addition, the 90 degree positions are useful in balancing the camera head 62.

Figure 35:
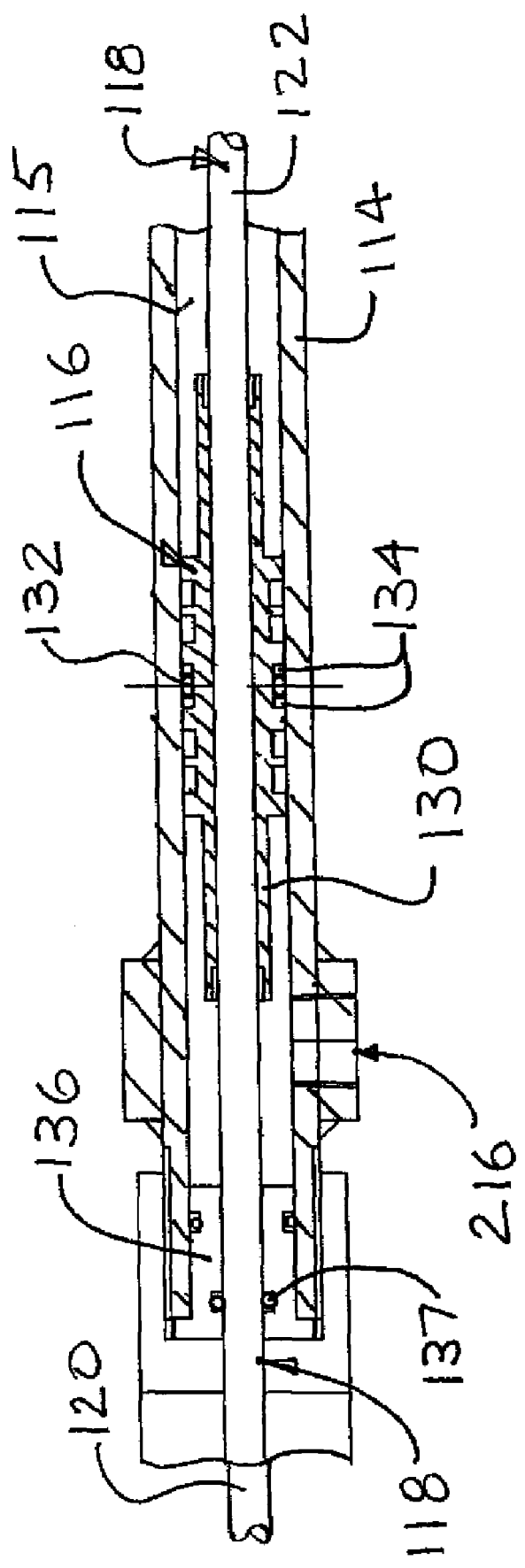
FIG. 35 is an enlarged section view of the piston within the hydraulic cylinder shown in FIG. 10.

The crane 30 has a hydraulic system 100 which provides the driving force for extending and retracting the crane arm 35. Referring to FIGS. 2, 3, and 27-30, the hydraulic system 100 includes a hydraulic cylinder 114 attached to the top of the first section 52. A hydraulic cylinder cable 118 extends through the hydraulic cylinder 114. A first end 120 of the cable 118 extends out through a rear cable seal 136, as shown in FIGS. 27 and 35, and extends around a rear hydraulic cylinder cable pulley 126, and is attached to the counter weight carrier 50 via a cable tie, clamp, or turnbuckle 128. Similarly, a second end 122 of the hydraulic cylinder cable 118 extends forward through the hydraulic cylinder 114 from the piston 116, through a front cable seal 136, extends around a front hydraulic cylinder cable pulley 124, and is attached to the counter weight carrier 50, also via a cable tie, clamp, or turnbuckle 128. The cable seals 136 allow the cable 118 to slide through while sealing hydraulic fluid within the cylinder 114.

The hydraulic cylinder cable 118 is attached to a piston 116 which is movable back and forth within the hydraulic cylinder 114. As shown in FIG. 35, the piston 116 has front and rear piston crimp extensions 130 which are tightly crimped onto the cable 118. Of course, other attachments, such as screw threads, welding, adhesives, clamping, etc., may equivalently be used. Referring still to FIG. 35, a piston seal or O-ring 132, backed by plastic or Teflon (Fluorine resins) seal rings 134, provides a sliding seal between the piston 116 and the cylindrical inside walls of the hydraulic cylinder 114. The hydraulic cylinder cable 118 advantageously has internal twisted bundles of high strength filaments, fibers, or wires, surrounded by a plastic or vinyl covering or sheath. The ends of the cylinder 114 are sealed with an end cap or plug 136. An O-ring 137 in the end cap seals around the smooth covering on the cable, while allowing the cable to slide in and out of the cylinder. As hydraulic fluid pressure is exerted against either the front or back side of the piston 116, as described below, the piston 116 moves through the hydraulic cylinder 114, correspondingly moving the counter weight carrier 50 in the opposite direction. The hydraulic system 100 also includes other components for driving and controlling the hydraulic cylinder 114. The design and operation of these other hydraulic system components, which are generally located within a hydraulic system enclosure or housing 106 attached to the bottom of the first section 52, is described below. As shown in FIG. 27, the hydraulic cylinder 114, pulleys 124, 126 and cable 118 are provided as assembly 125.

Figure 23:
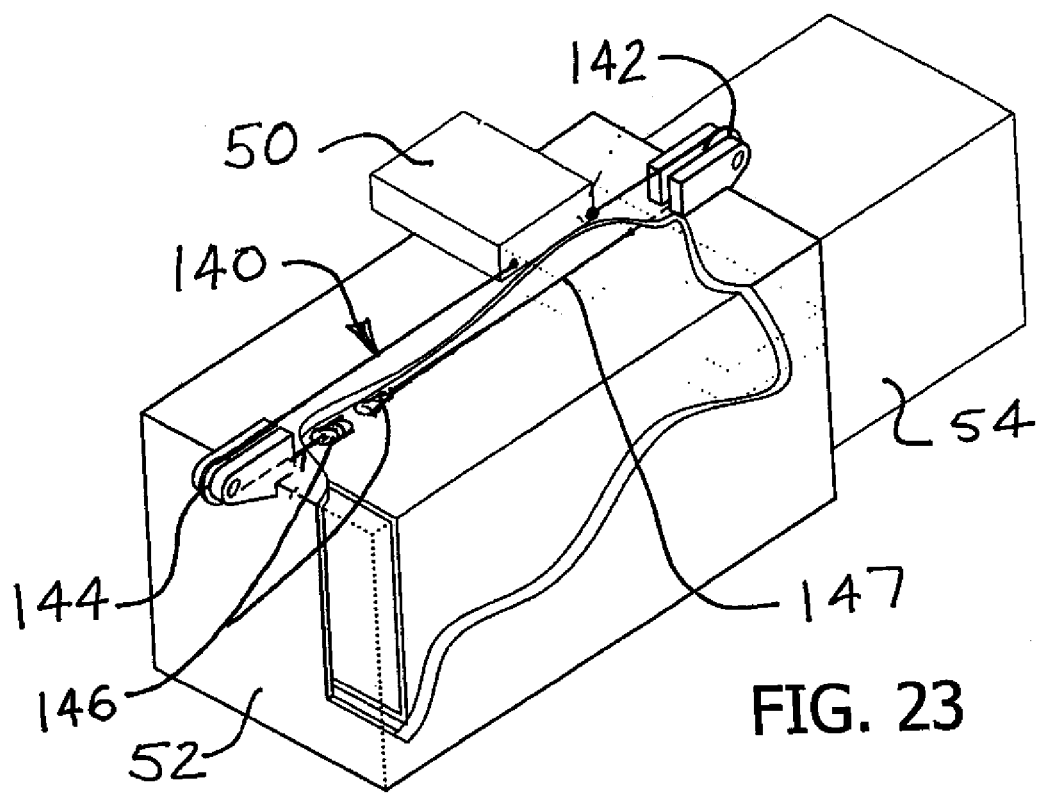
FIG. 23 is a perspective view diagram showing the second or a center section drive cable connecting the counter weight carrier and the center tube.

The crane arm 35 also includes a drive system 102, which extends and retracts the second section 54 and the third section 56, upon actuation of the hydraulic cylinder 114. Referring to FIGS. 3 and 23, a second section rear drive cable 140 (or pair of side-by-side cables) is attached to the top surface of the second section 54, via a cable tie, clamp or turnbuckle 146, adjacent to the back end of the second section 54, extends around a rear pulley 144 attached to the back end of the first section 52 and is attached near the back end of the second section 54. A second section forward drive cable 147 is attached to the counter weight carrier 50, extends forward around a front pulley 142, supported near the front end of the top surface of the first section 52, and is attached to the top surface of the second section 54, near the back end of the second section 54. Consequently, as the counter weight carrier 50 moves along the top of the first section 52, the second section 54 is moved by an equal amount, in an opposite direction.

Figure 24:
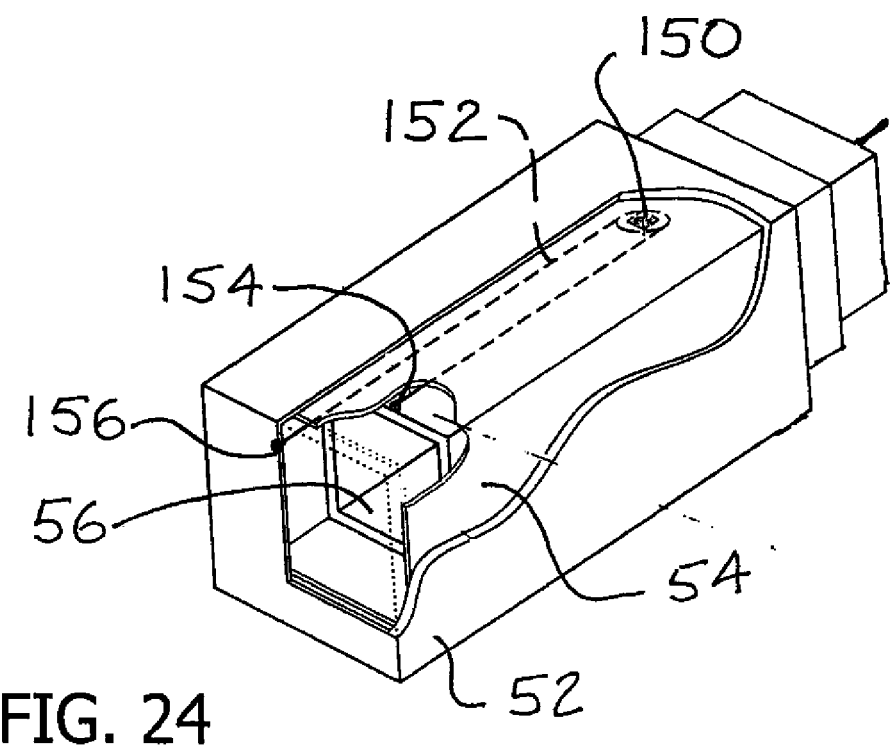
FIG. 24 is a perspective diagram showing the top extending cable.

The drive system 102, as shown in FIGS. 3 and 24, also includes a top extending cable 152, and a symmetrical or mirror image or bottom extending cable 153, shown in profile in FIG. 8. As shown in FIG. 24, the back end of the top extending cable 152 is attached to a back wall of the first section 52 at a cable anchor or tie point 156. The top extending cable 152 extends forward, between the second section 54 and the third section 56, runs around a top drive pulley 150, secured to the inside top surface of the second section 54 and is attached at the rear top surface of the third section 56, via a cable anchor or turnbuckle 154. The top drive pulley 150 is mounted on the top inside surface of the second section 54, near the front end of the second section 54. The bottom extending cable 153 has the same design. As the second section 54 is extended out of the first section 52, via movement of the counter weight carrier 50 driven by the hydraulic cylinder 114, the drive pulleys 150 (one each on the top and bottom of the second section 54) pull the third section 56 out of the second section 54. Accordingly, when the hydraulic cylinder 114 is actuated to extend the crane arm 35, the third section 56 extends out of the second section 54 by the same amount (and in the same direction) as the second section 54 extends out of the first section 52. This rearward movement of the counter weight carrier 50, forces the forward movement of the third section 56 at double the (rearward) movement of the counter weight carrier.

Figure 25:
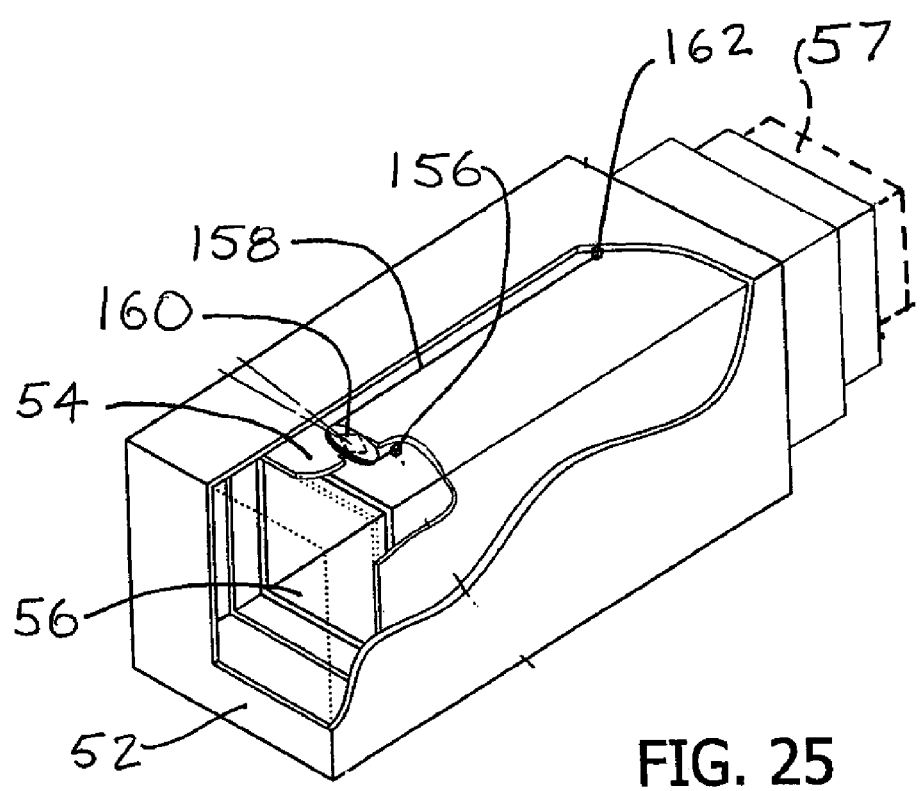
FIG. 25 is a perspective diagram showing the upper retracting cable.

The drive system 102 also includes a top retraction or pull back cable 158, and a bottom retraction or pull back cable 159, as shown in FIGS. 8 and 25. Referring to FIG. 25, the first or front end of the top pull back cable 158 is attached to the top inside surface of the first section 52, with a cable anchor or turnbuckle 162. The top pull back cable 158 then extends rearwardly, between the first section 52 and the second section 54, to a retraction pulley mounted on the top back end of the second section 54. For purposes of illustration, the bottom extension and retraction cables and pulleys are not shown in FIGS. 24 and 25. However, they are duplicates of the top cable and pulley designs shown in FIGS. 24 and 25. Top and bottom cables and pulleys are used to provide precise, smooth and more evenly balanced telescoping movement of the sections. However, single cable designs may also be used. Chains and sprockets may also be used in place of cables and pulleys.

The top retraction or pull back cable 158 extends around the top retraction pulley 160, passes through the slot or opening in the second section, and is attached to the top back end of the third section 56 with a cable anchor or tie 156. The bottom pull back cable 159 has the same design. Both retraction or pull back pulleys 160 and 161 are oriented in a plane P at an angle of 20-45 and preferably 30 degrees, to allow the pulleys to fit within a compact space between the second and third sections, as shown in FIG. 8.

Referring momentarily to FIG. 25, as the second section 54 is retracted or pulled back into the first section 52, via the hydraulic cylinder 114 moving the counter weight carrier 50, the top and bottom retraction pulleys 160 and 161 on the second section 54, move rearwardly with the second section 54, pulling the third section 56 back into the second section 54.

Turning momentarily to FIG. 7, with smaller versions of the crane arm 35 (e.g., having an extended length of about 15 feet, as measured from the tilt axle 70 to the nose axle 196, the moving sections 54 and 56 may be straight. For longer versions of the crane arm 35, the second and third sections 54 and 56 are advantageously formed with a slight upward radius of curvature R. The radius R will vary, depending on bending and deflection characteristics of the sections. Stiffer sections (i.e., having a shorter length, thicker walls, or greater moment of inertia) will have less curvature, i.e. R will be greater. As one example, where the second and third sections are an 8 inch and a 6 inch square aluminum tube, each about 170 inches long (i.e., for a crane arm having an extended length of about 31.5 feet), R is preferably 8,000-20,000, 10,000-18,000, or 13,000-15,000 inches. This upward curvature helps to compensate for sagging of the arm 35 when loaded. With an average payload of about 150 lbs (including the camera 64, camera head or frame 62 and extension 60), and with arm at a 30° elevation angle, the upward curvature R offsets the bending deflection, and the arm 35 is straight. With different payloads and elevation angles, the arm 35 will curve slightly up or down, but it will always be straighter than an arm without any fault in upward compensating curvature R. Having the arm 35 remain straighter improves performance because it helps to keep the center of gravity of the payload centered on the central axis of the arm 35. Consequently, the arm 35 is less subject to eccentric loads or torsional loading, resulting in a more stable camera platform. In addition, the straighter arm 35 is more easily kept in balance.

Figure 12:
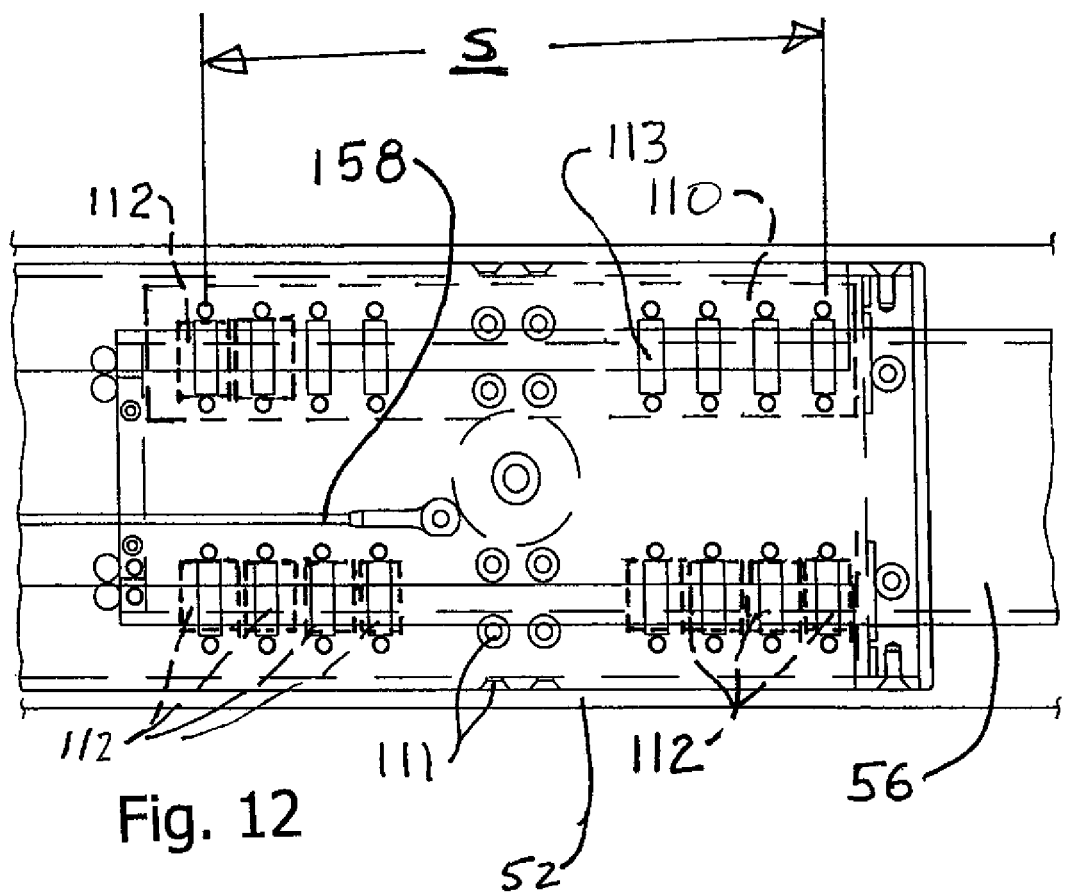
FIG. 12 is an enlarged plan view of the front end of the second arm section shown in FIG. 6.
Figure 13:
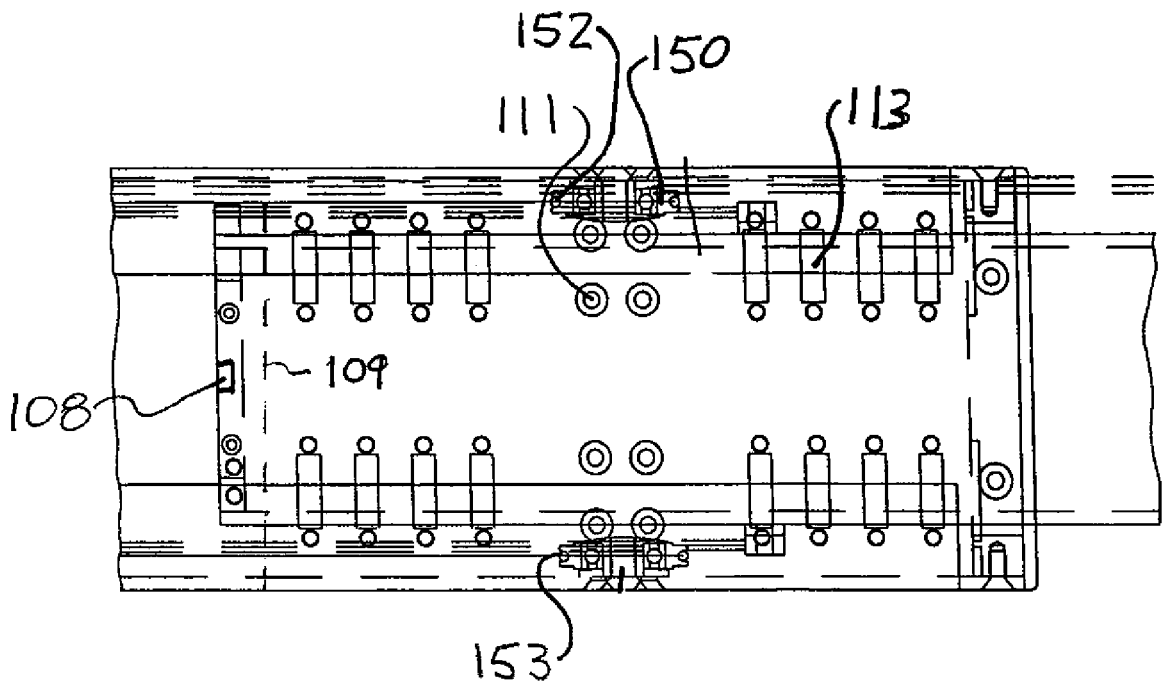
FIG. 13 is a side view thereof.
Figure 14:
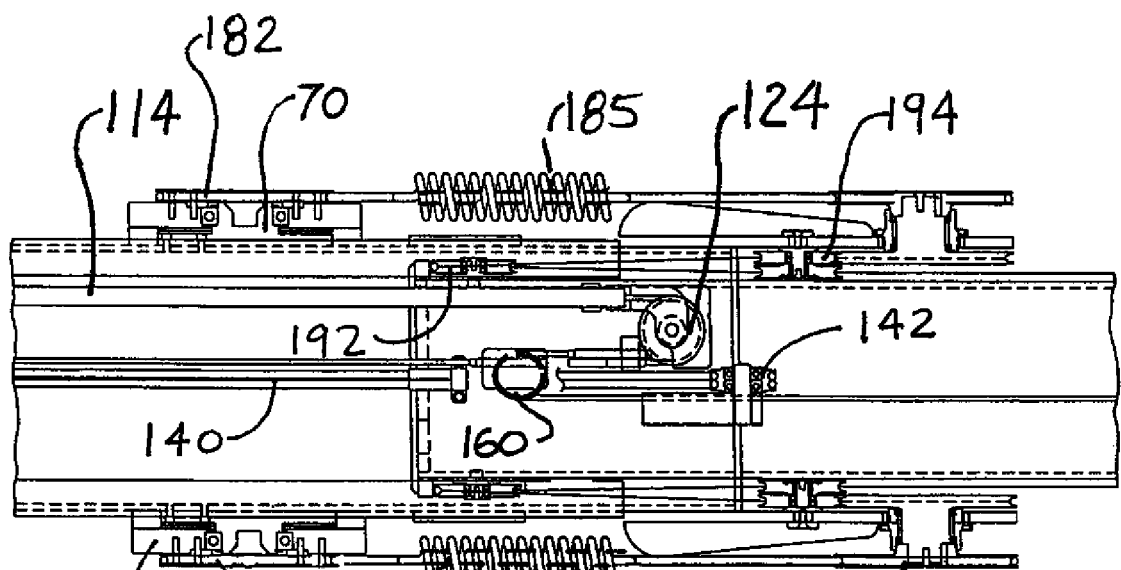
FIG. 14 is an enlarged plan view of features shown in FIG. 4.
Figure 15:
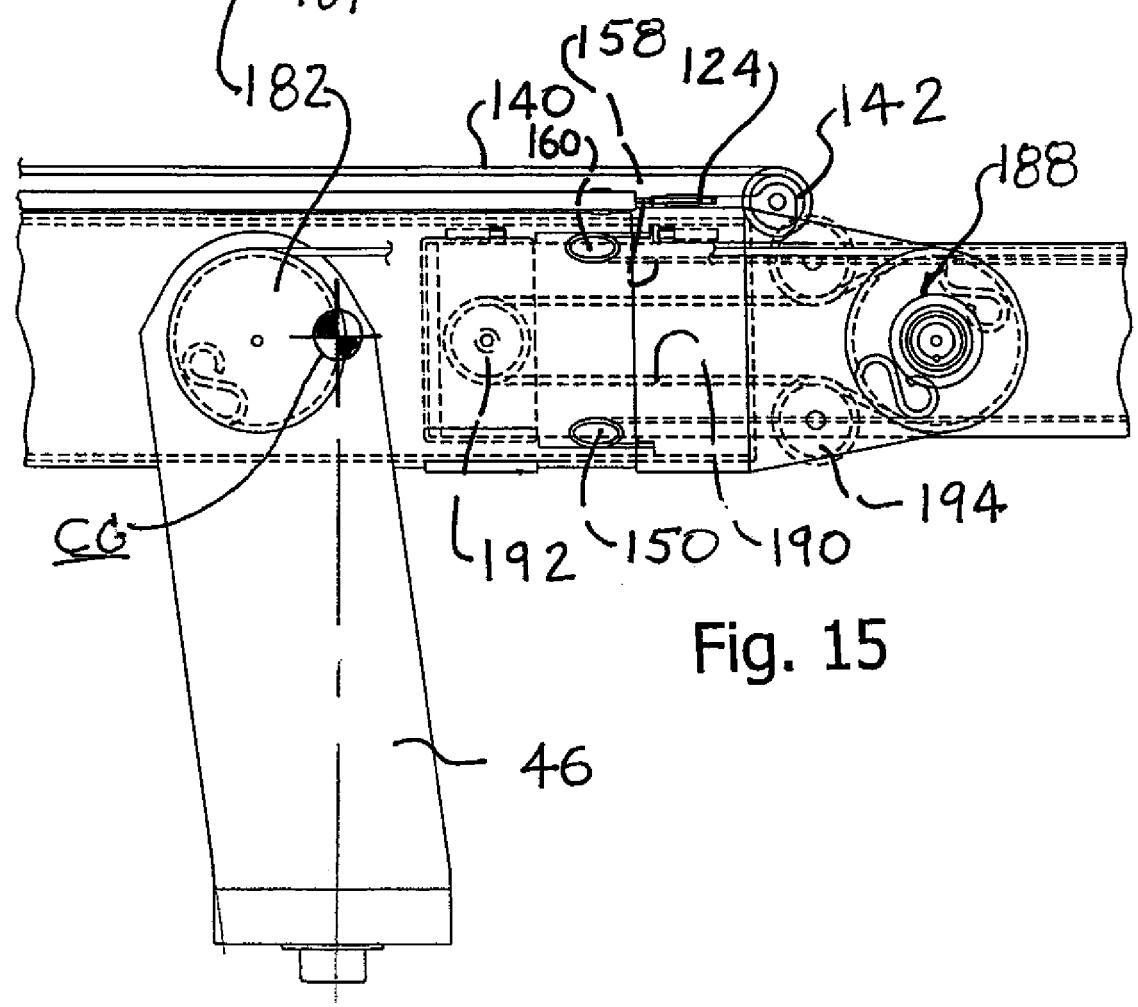
FIG. 15 is a side view thereof.
Figure 17:
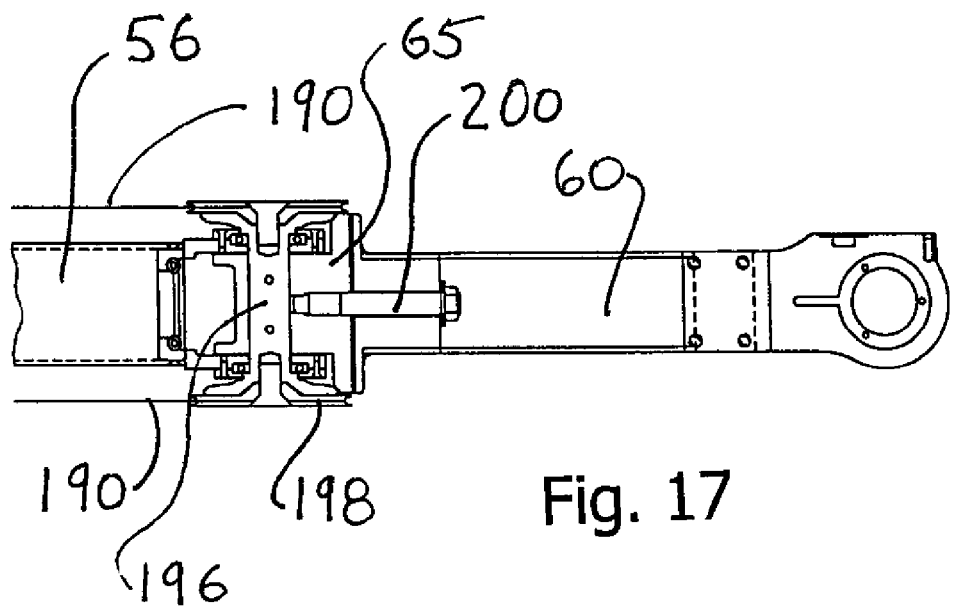
FIG. 17 is a plan view thereof.
Figure 16:
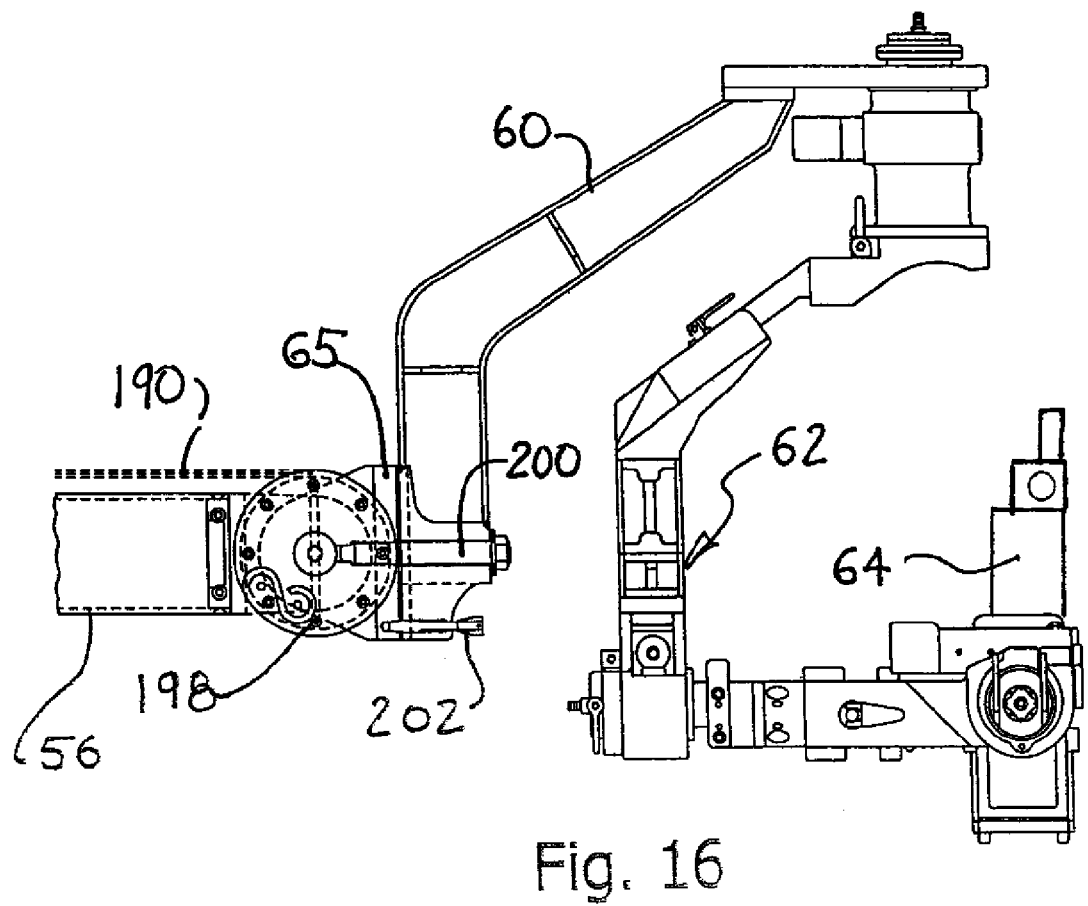
FIG. 16 is an enlarged side view of the front end of the crane arm shown in FIGS. 2 and 7.
Figure 18:
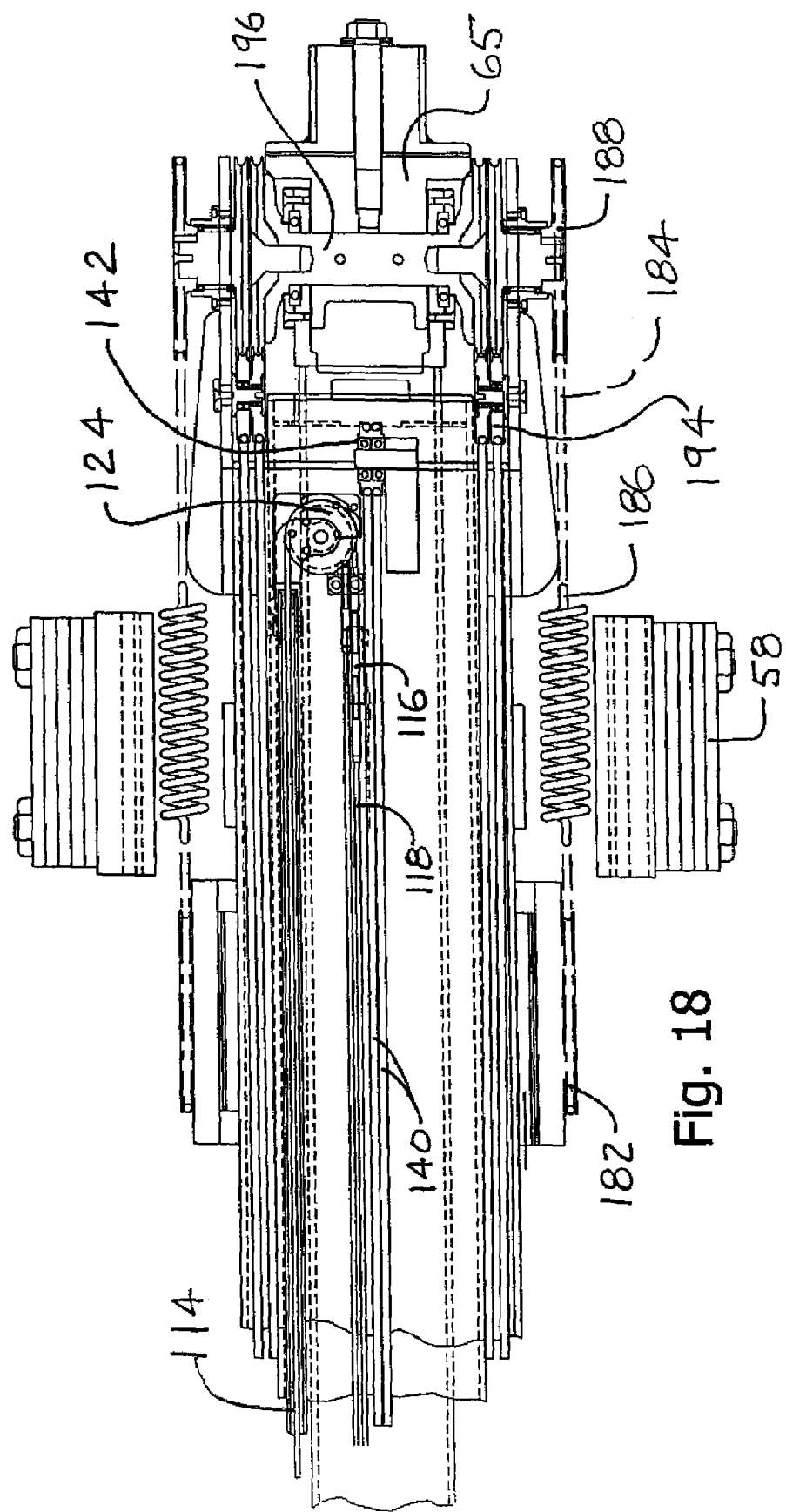
FIG. 18 is an enlarged plan view, in part section, of the crane arm in the retracted position, as shown in FIGS. 4 and 5.
Figure 21:
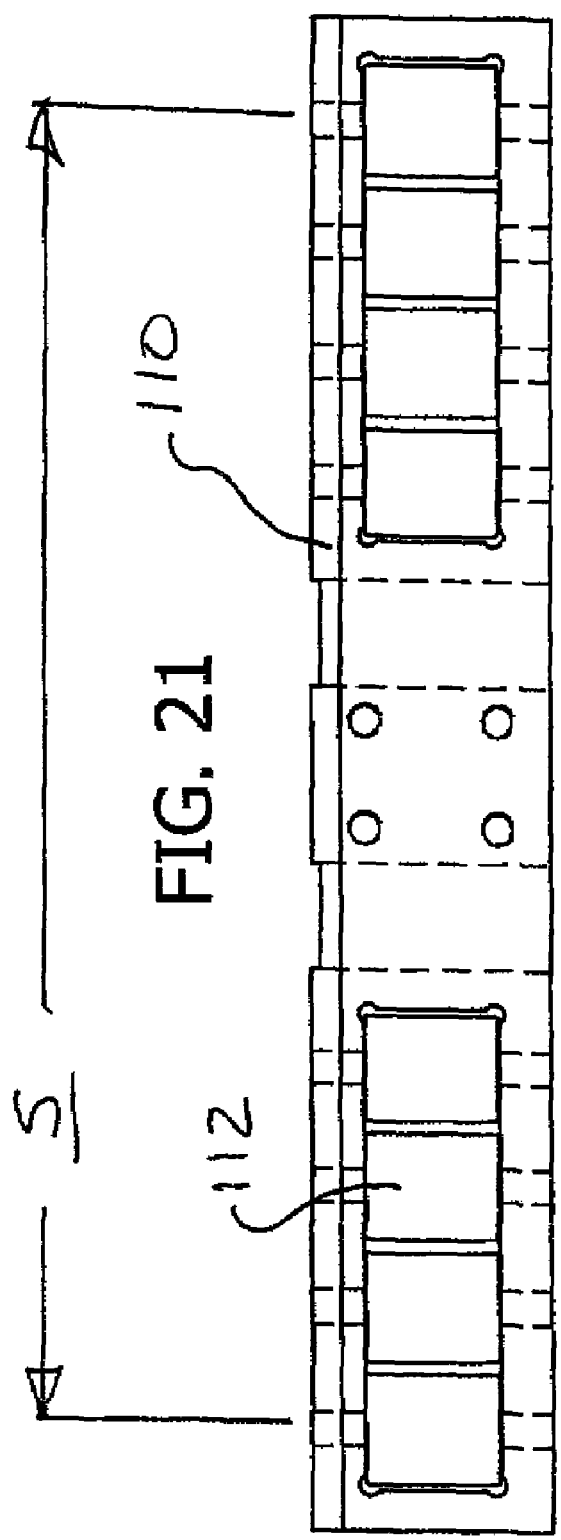
FIG. 21 is a top view of a roller bracket assembly for installation in the front end of the second section, as shown in FIGS. 12 and 13.
Figure 22:
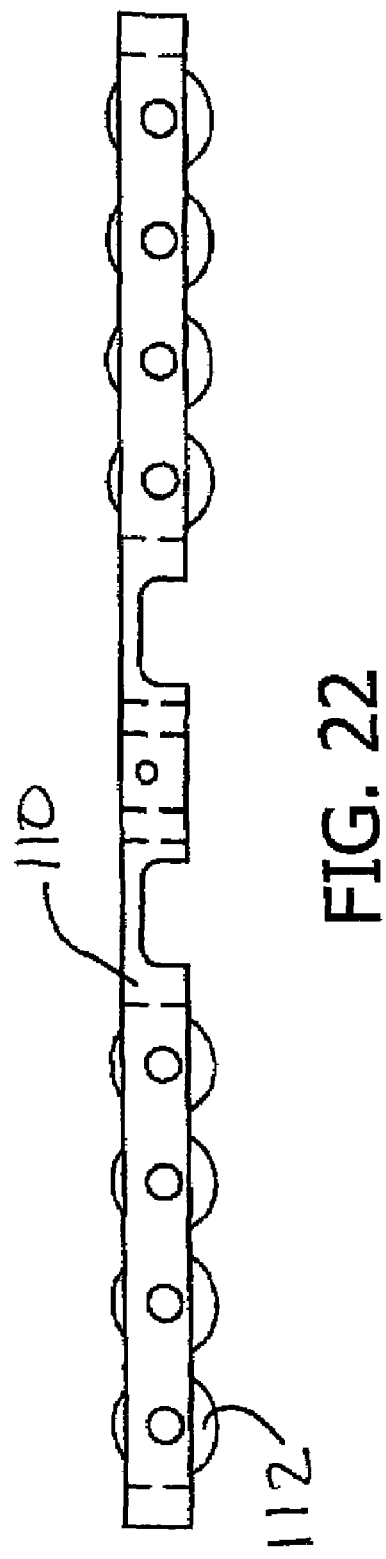
FIG. 22 is a side view of the roller bracket shown in FIG. 21.

Referring to FIGS. 12, 13, 21, and 22, the third section 56 is supported within the second section 54 by rollers 112 mounted on roller mounting plates or brackets 110. The roller brackets 110 are attached to the inside surface of the front end of the second section 52. Specifically, two roller brackets 110 are attached to the inside top, bottom, left, and right interior sides of the front end of the second section 52, for a total of 8 roller brackets. As shown in FIGS. 12 and 21, the roller spread or footprint, i.e., the distance S between the front and rear rollers is minimized. This reduces the overlap between the second section 54 and the third section 56 when the crane arm 35 is fully extended. Consequently, the crane arm 35, while typically having only 2 moving sections, has an increased reach, while also remaining relatively compact when retracted. The rollers 112 are preferably made of a relatively soft plastic or non-metal, preferably having a Shore hardness of 70-90. This provides for smooth and quiet rolling between the sections. In addition, the rollers 112 help to absorb and reduce transmission of vibration between the sections. The rollers 112 and brackets 110 are similarly used to telescopically support the second section 54 within the first section 52. For larger versions of the crane arm 35, the dimension S is increased, to better carry larger loads. As examples, for a crane arm 35 with about a 15 foot length (measured from the tilt axle to the nose axle) the dimension S is about 11 or 12 inches. With a crane arm having a length of about 30 or 31 feet, the dimension S is about 23 or 24 inches. The brackets 110 are advantageously bolted into position and fit tightly around the section they support. As shown in FIGS. 12 and 13, cutouts, grooves, or recesses 113 may be made in the sections, to provide clearance for the rollers 112. For clarity of illustration, only one of the brackets 110, and only some of the rollers 112, are shown in FIG. 12, and they are omitted entirely from FIG. 13. The arm sections 52, 54, and 56 are preferably hard anodized, to provide a hard surface which the rollers 112 roll on. Felt, or non-absorbing nitrile, rubber or plastic strips or wipers attached around the openings of the first section 52 and the second section 54 can be provided to wipe the second section 54 and the third section 56, as the crane arm 35 extends and retracts.

A mechanical stop 108 at the back end of the third section 56 contacts a bracket 109 on the second section 54 to provide a hard mechanical stop and to limit the extension of the third section 56 out of the second section 54. The extension of the third section 56 out of the second section 54 is also limited by the length of the extension cables 152 and 153.

Referring to FIG. 8, the first section 52, second section 54, and third section 56 are preferably square or nearly square aluminum tubes. In the design shown in the drawings, which provides an extension of travel length of approximately 112 inches, the first section is a 10×10¾ inch square tube, the second section is an approximately 8 inch square tube, and the third section is an approximately 6 inch (outside dimensions) square tube. Larger and smaller versions can of course also be made. The sections may be formed as extrusions, weldments, bolted plates, or in similar ways. Drain holes may be provided in the sections 52 and 54, to reduce buoyancy forces when they are submerged. As shown in dotted lines in FIG. 25, a fourth section 57 may also be used, as a third moving section, to further increase the reach of the arm. The size, shape and number of telescoping sections, material selections, actuator (e.g., hydraulic, electric, etc.) type, attachment techniques and accessories, are not essential to the invention and can be changed.

The crane arm 35 includes a leveling system 104 to maintain the nose plate 65, and any accessory attached to it, such as the extension or riser 60 and the camera head 62, in a horizontal or level orientation, regardless of the elevation angle AA (shown in FIG. 2) of the crane arm 35. The leveling system 104 consequently maintains the camera 64 supported directly or indirectly by the nose plate 65, in a horizontal position.

Referring now to FIGS. 3, 14, 15, 19, 20, and 35, the leveling system 104, on the right side of the crane arm 35, includes a cable pulley 182 rigidly attached to the center post 46. The back end of a spring cable 184, which includes a spring 186, is attached to the cable plate 182. The front end of the spring cable 184 is attached to a rear leveling axle assembly 188. The rear leveling axle assembly 188 is pivotably supported on front end frame 180 attached to the front end of the first section 52. A first end 189 of a leveling cable 190 is attached to an inside pulley on the rear leveling axle assembly 188. The leveling cable 190 extends rearwardly from the axle assembly 188, over an idler 194, around a rear leveling cable pulley 192 rotatably attached to the rear right side of the second section 54, and then extends forward under a second idler 194 and is attached to a nose pulley 198 joined to the nose axle 196. The same components are symmetrically provided on the left side of the crane arm 35.

Referring to FIGS. 19 and 20, the leveling cable 190 wraps around the nose pulley 198, and is attached to e.g. clamped within the nose pulley 198. Referring to FIGS. 2 and 3, the weight of the payload, e.g., the camera 64, as well as any camera head 62 or extension 60, if used, exerts a downward or clockwise (in FIGS. 2 and 3) torque acting on the nose axle 196. Consequently, the leveling cable 190 and spring cable 184 are typically maintained under constant tension. The spring 186 is selected with a spring constant to provide a level of flexibility in the leveling system 104. In the event that the nose plate 65, extension 60, or camera head 62 is moved forcefully into an overhanging surface or ceiling, the spring 186 extends, allowing the nose plate 65 to move downwardly (clockwise in FIG. 3) to reduce or avoid damage to the crane arm 35, extension 60, or camera head 62. The spring 186 may be omitted, or it can be locked out by a rigid cable link 185, or dampened with a shock absorber 187, shown in dotted lines in FIG. 14. During extension of the crane arm 35, the rear leveling cable pulley 192, which is attached to the second section 54, moves forward at one-half the rate of the nose pulley 198 supported on the third section 56. Accordingly, tension in the leveling cable 190 is not affected by extending or retracting the crane arm 35. A clutch 195 may also be provided between the nose axle 196 and the nose pulleys 198, to allow the nose plate 65 to pivot downwardly under excessive momentary loading.

Figure 30:
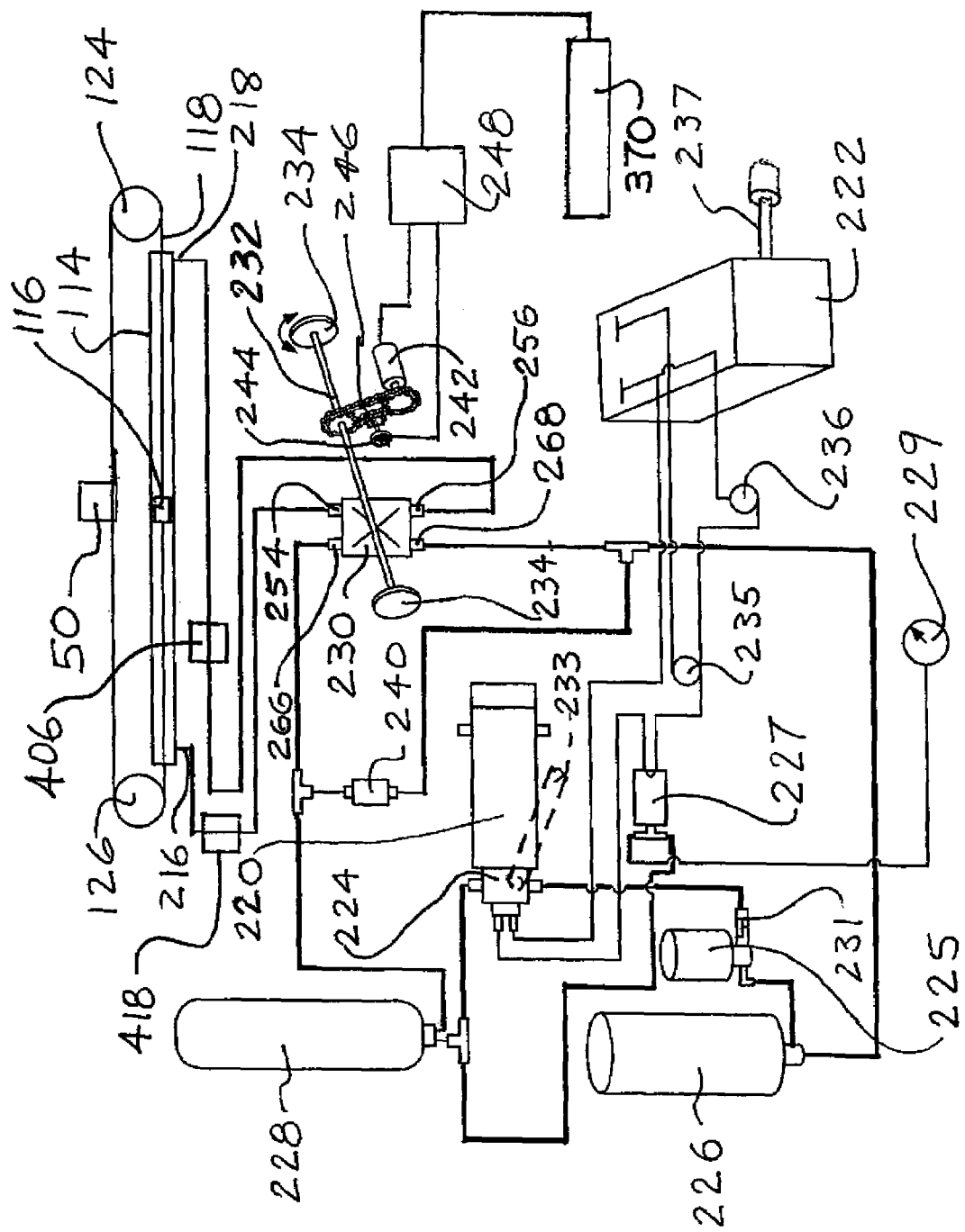
FIG. 30 is a schematic diagram showing the entire hydraulic system of the crane arm shown in FIGS. 1-7. Bold lines indicate hydraulic lines. Light lines indicate electrical lines.

The hydraulic system 100 is shown in detail in FIGS. 3, 11, and 27-34. The hydraulic system 100 provides the motive force for moving the counter weight carrier 50 and simultaneously extending or retracting the crane arm 35. In normal and preferred operation, the crane arm 35 is balanced. Forward, or upward movement of the payload is compensated by rearward or downward movement of the counter weight carrier 50 and the mobile counter weights 58. Accordingly, the hydraulic system 100 generally need only overcome forces of friction and inertia, to extend or retract the crane arm 35. As a result, the hydraulic system 100 is compact and energy efficient. The components making up the hydraulic system 100, which are shown in FIG. 30, are preferably contained within the hydraulic system housing 106, except for the hydraulic cylinder 114 which extends along the top surface of the first section 52.

Figure 11:
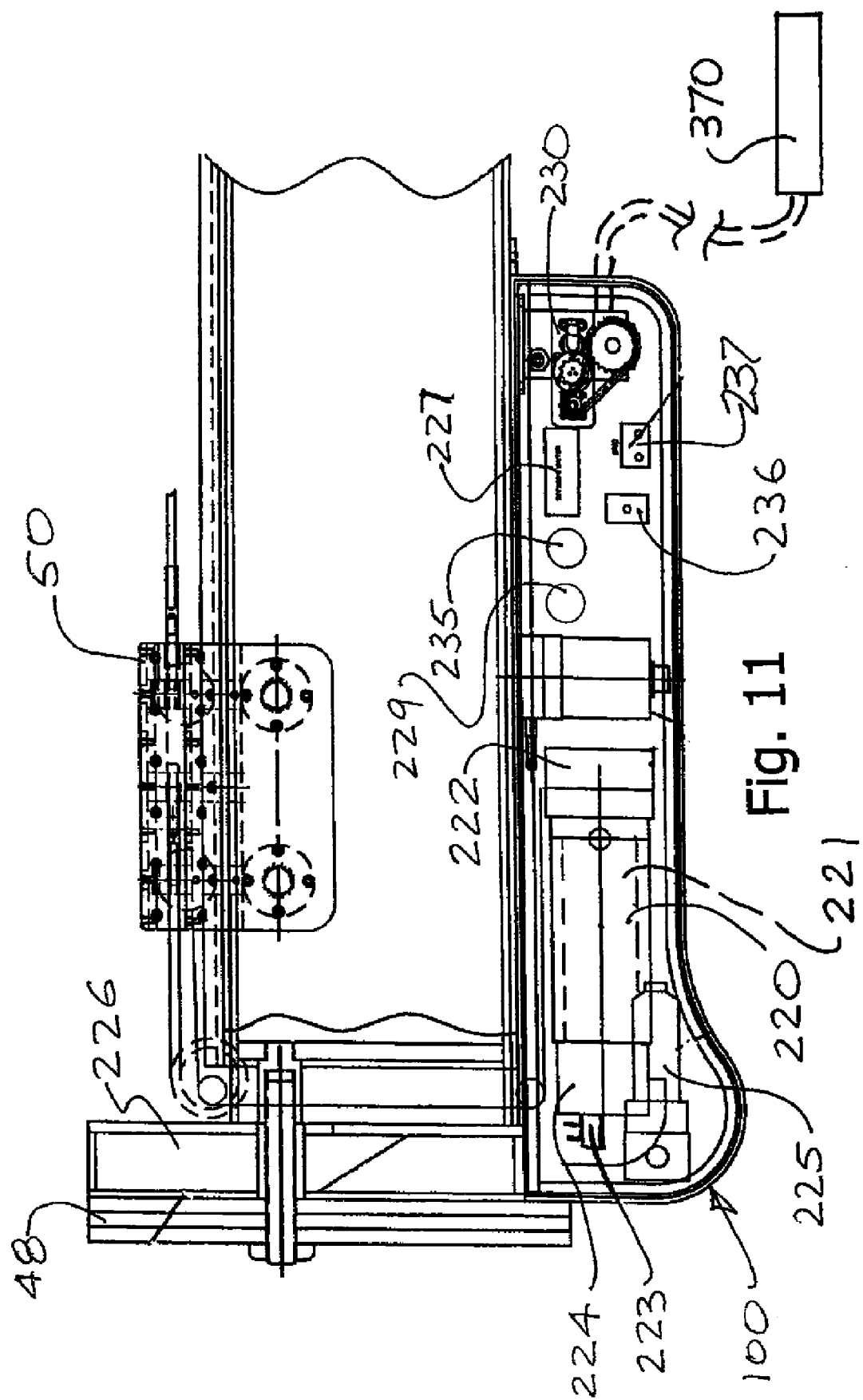
FIG. 11 is a side view thereof.

As shown in FIG. 30, a pump 224 driven by an electric motor 220 charges or pressurizes an accumulator 228. Instead of the motor 220, a hand pump 233 may be used. The battery 222 can be charged by an external AC plug-in connection 237. Referring to FIG. 11, a cooling system 221, optionally including a recirculating liquid coolant, such as water, pumped through a radiator, may be provided around the pump motor, to cool the motor.

The accumulator 228 is connected via fluid lines to a valve assembly 230, and also to a pressure switch 227, which automatically switches off the motor 220 when a pressure limit is reached within the accumulator 228. A pressure gauge 229 linked to the accumulator 228 is visible through a window or opening in the enclosure 106. A battery 222 connects to the motor 220 through a on/off switch 236 and the pressure switch 227. An on/off indicator 235 is viewable through a window or opening in the enclosure 106. A relief valve 240 joins into a T-fitting in the line linking the accumulator 228 and the valve assembly 230, to relieve excess pressure in the accumulator 228, and return hydraulic fluid to a reservoir or tank 226. The reservoir 226 provides unpressurized hydraulic fluid, through a filter 225 and a check valve 231 to the inlet of the pump 224.

A valve shaft 232 extends through the valve assembly 230. Control knobs 234 are provided at each end of the valve shaft 232, so that the valve assembly 230 can be controlled from either side of the crane arm 35. Referring to FIGS. 36-38, a chain or belt 290 connects a shaft sprocket 296 on the valve shaft 232 with a motor sprocket 294 on a valve control motor 242. An adjustment and potentiometer idler sprocket 298 is also engaged with the chain 290, and is linked to a potentiometer 244. The potentiometer 244 and the valve control motor 242 are both connected to an electronic controller 248. The potentiometer 244 has a small cable transducer attached to the counter weight carrier and provides electrical signals to the controller 248 based on position, and speed and direction of movement of the counterweight carrier, which is proportional to the extension position of the arm 35. Stops limit rotation of the valve 230.

Figure 31:
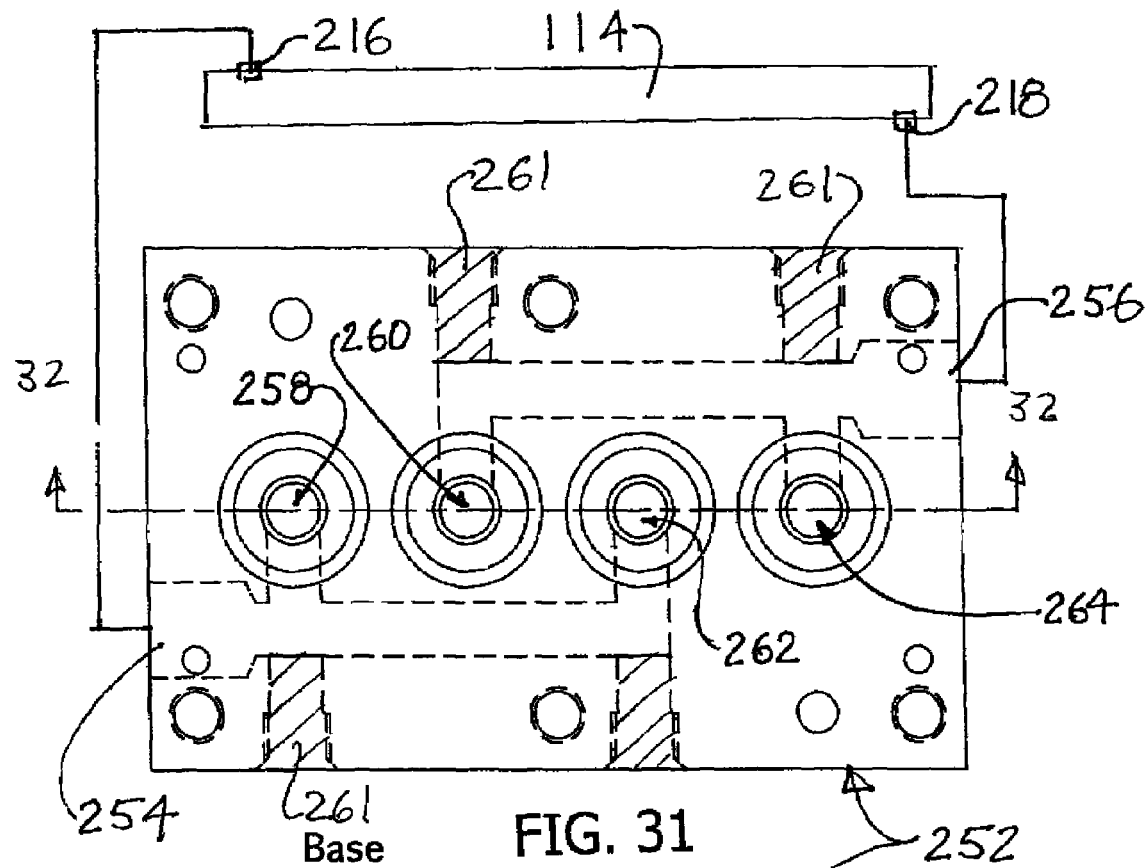
FIG. 31 is a top view of the base section of the hydraulic valve shown in FIG. 27, and further showing connections between ports of the base section and the hydraulic cylinder shown in FIGS. 27 and 28.
Figure 32:
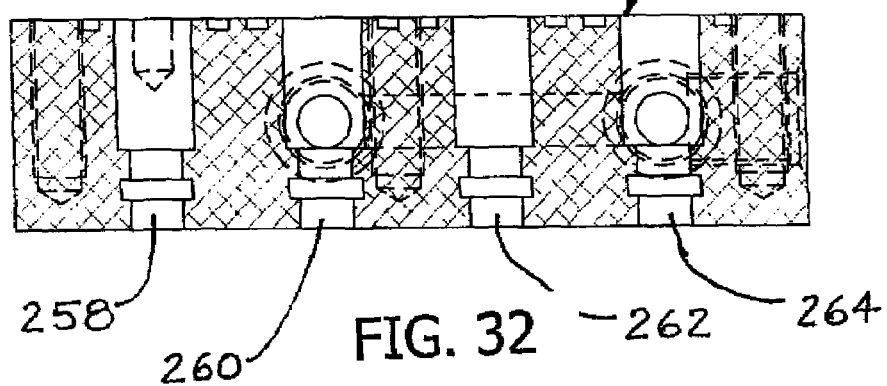
FIG. 32 is a section view taken along line 32-32 of FIG. 31.
Figure 34:
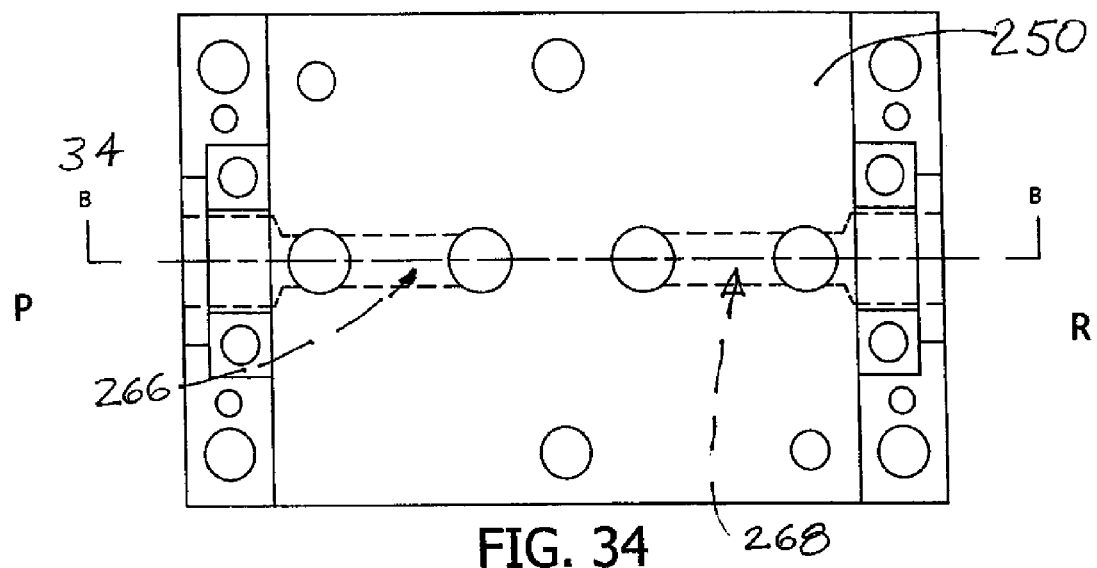
FIG. 34 is a section view taken along line 34-34 of FIG. 33.
Figure 33:
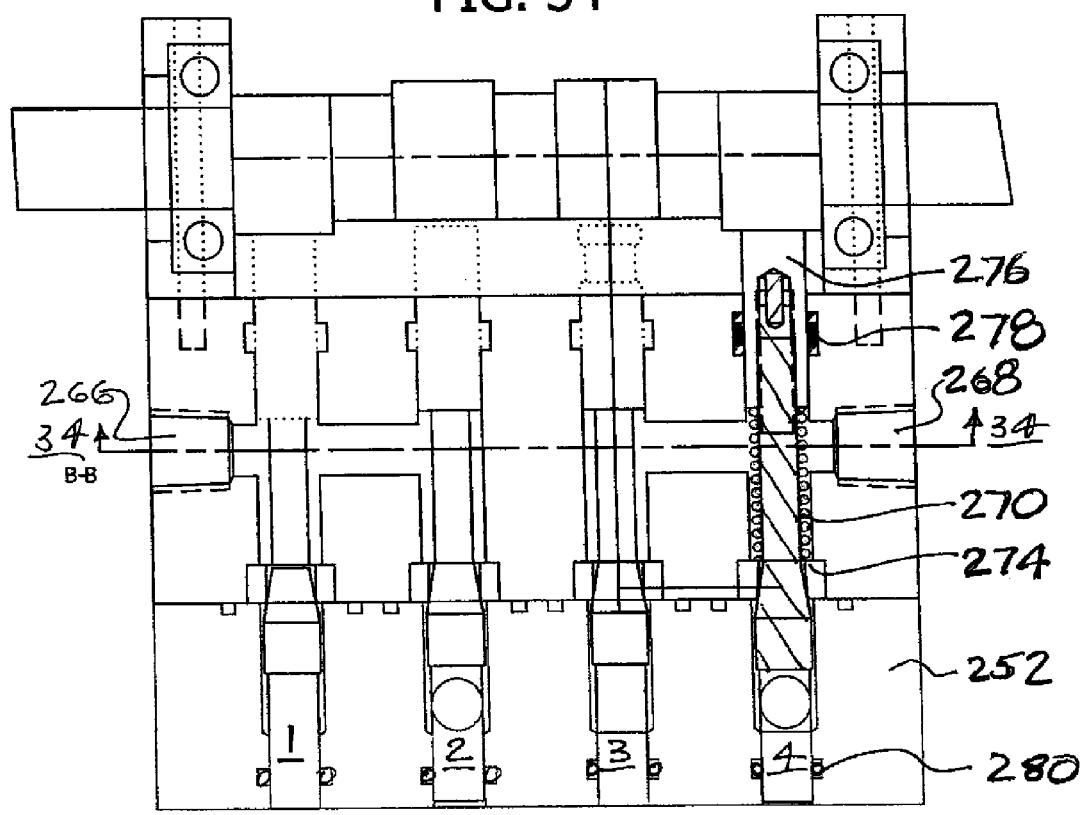
FIG. 33 is an enlarged section view of the valve assembly shown in FIGS. 27 and 30.

Referring to FIGS. 27, and 31-34, the valve assembly 230 includes a valve block 250 attached to a base 252. First, second, third, and fourth valve pins 259, 261, 263, and 265 are positioned within first, second, third, and fourth bores 258, 260, 262, and 264 in the valve block 250 and base 252, forming four valves. The first bore 258 connects with the third bore 262 via a first or rear drive port 254, as shown in dotted lines in FIG. 31. Similarly, the second valve bore 260 connects with the fourth valve bore 264 via a second or front drive port 256, also shown in dotted lines in FIG. 31. Plugs 261 seal drill openings made during manufacture, to provide right angle bends in the internal ports. The first or rear drive port 254 of the valve assembly 230 is connected to a rear port 216 of the hydraulic cylinder 114. The second or front drive port 256 of the valve assembly 230 is connected via a hydraulic line to a front port 218 of the hydraulic cylinder 114, as shown in FIGS. 27 and 31. A high pressure inlet port 266 is connected via a hydraulic line to the accumulator 228. A low pressure inlet port 268 in the valve block 250 is connected via a return hydraulic line to the reservoir 226. Each of the valve pins 259, 261, 263, and 265 is biased upwardly or into a closed position via a spring 270. In the up or closed position, a head on the hardened valve pin seals against a hardened valve seat 274 pressed and/or swaged into the valve body at the lower end of each bore. A valve piston 276 is centered on a shoulder and threaded onto each of the valve pins. This design provides a highly reliable and durable seal of each bore which is very resistant to leaking, even at high pressures. The springs 270 bias the valve pistons 276 against cam lobes 272 on the valve shaft 232. Small clearances assure seating of the valve pins in the valve seat, and provide a detent. The cam lobes are preferably 90 degree offset circles, to provide smooth (sinusoidal) movement of the valve pins. As shown in FIG. 33, O-rings 278 and 280 seal the pin bores.

The valve shaft 232 is set up with stops that limit rotation to about +/−85 degrees. This allows for complete valve control, without the need to remove and reposition the users hand on the control knob 234. Ergonomics are improved. Using a potentiometer 244 having a 170 degree range of movement in one direction, plus 170 degrees in the other direction, and 2:1 tooth ratio between the shaft sprocket 296 and the idler 298, allows for use of the potentiometer over its entire range, for greater control sensitivity. As the valve shaft 232 is turned, either manually by gripping and turning the control knob 234, or automatically via the valve control motor 242 and electronic controller 248, the ports in the valve assembly 230 are opened and closed, to control movement of the piston 116 within the hydraulic cylinder 114. For example, with the valve shaft 232 at a zero degree position, all ports are closed and no movement of the crane arm occurs. To begin to extend the crane arm 35, the valve shaft 232 is turned (clockwise in FIG. 30). This opens first and fourth valves, connecting the rear port 216 to the accumulator and simultaneously connects the front port 218 to the reservoir, through the valve assembly 230. Hydraulic fluid pressure on the back of the piston 116 exceeds the fluid pressure on the front surface of the piston, causing the piston 116 to move forwardly (to the right in FIGS. 3, 27, and 30. The hydraulic cylinder cable 118 is driven counter-clockwise (in FIG. 30). The counter weight carrier 50, which is attached to the hydraulic cylinder cable 118 moves rearwardly upon the top surface of the first section 52. Referring momentarily to FIG. 23, as the counter weight carrier 50 is driven rearwardly, the second section drive cable (or pair of cables) 140 drives the second section 54 forwardly. Referring momentarily to FIG. 24, this forward movement by the second section 54 simultaneously drives the third section 56 forwardly, via the forward movement of the third section drive pulley 150 and 151 (both attached to the second section 54) acting on the top and bottom extending cables 152 and 153. As a result, the third section 56, moves outwardly to the desired camera position. To reverse direction and retract the crane arm 35, the valve shaft is turned back (counter clockwise in FIG. 30) through the stop or closed position. This closes the first and fourth valves and then opens the second and third valves. Now, the hydraulic connections to the hydraulic cylinder are reversed, driving the piston in the hydraulic cylinder in the reverse direction and retracting the arm. The speed of extension and retraction will increase with increasing movement of the valve shaft away from the zero or closed position, due to the shape of the cams. Since the valve assembly to 30 is pressure compensated, only small amounts of force are required to turn the valve shaft 232 and open and close the valves.

In use, the crane 30 is shipped to the filming location in the retracted position. The trim weights 48, and the mobile counter weights 58, and any riser or extension 60 and camera head 62 are preferably separated from the camera crane 30 and transported individually to make transportation easier. At the filming location, the crane 30 is attached to a mobile base 32. The riser or extension 60 and the camera head 62 (if used) are attached to the nose plate 65. The camera and any accessories are attached to the camera platform. Mobile weights 58 are added to the weight carrier until the arm is balanced. The center of gravity CG of all of the moving elements is therefore then fixed, and remains on the pan axis P shown in FIG. 15, whether the arm is extended or retracted or in between. Correspondingly, the center of gravity CG of the arm 35 also remains centered over the pan bearings 42 and 43. As a result, during panning movement, the weight load of the arm remains centered on the bearing. Deflection during panning of the center post 46, or of the frame or tires of the mobile support, is reduced or avoided entirely. This provides a more stable support for the camera. If needed, trim weights are added to precisely balance the crane arm 35. While the trim weights will typically be added at the back end of the arm, for some uses, they may also be attached near the front end of the arm.

The camera head 62, if used, is balanced using known techniques, conveniently by moving the camera head 64 into a 90 degree position, as shown in FIG. 6. The hydraulic system 100 is charged, preferably by plugging wall current into the connector or plug 237 within the electrical system of the hydraulic system 100. Alternatively, power from the battery 222, controlled by the switch 235 is used to power the motor 220 driving the pump 224. As the hydraulic system 100 operates with only small volumes of hydraulic fluid, the accumulator 228 can be quickly charged. The crane 30 is then ready for use in filming.

The camera 64 is brought to the desired position by pivoting the crane arm 35 about the pan axis P shown in FIG. 8, and by pivoting the crane arm 35 about the tilt axis T. These pivoting movements are typically performed manually. As the arm 35 is balanced, little or no lifting force is required, and manual or hand force is required only to overcome friction and inertia. Alternatively as shown in FIG. 1, crane arm pan and/or tilt axis motors or actuators 74 and 76 can be provided on the mobile base or crane arm to perform these operations. The actuators 74 and 76, as well as the hydraulic control valve assembly 230, may optionally be remotely controlled, via a control box 275 connected to each of them via a wired or wireless connection. This allows the entire crane 30 to be remotely controlled. Pan and tilt sensors 75 and 77 (shown in FIGS. 8 and 2) provide rate, direction, and/or position information to the control box 275.

The telescoping movement of the crane arm 35 is initiated by turning the control knob 234. This actuates the valve assembly 230, supplying hydraulic fluid to the hydraulic cylinder 114 to drive the piston 116, counter weight carrier 50, and in turn the second and third sections 54 and 56, as described above. The controller 248 can be set up or programmed to actuate the valve control motor to operate the valve assembly. This allows the crane arm 35 to automatically move to pre-selected positions, or to perform pre-programmed movements. (The remote control box 275 may be similarly programmed, with positions or movements (pan, tilt, telescope extend/retract) for the entire crane 30, and/or the camera head 62.)

As shown in FIG. 1, using the camera head 62 allows the center of gravity CGP of the payload (typically the camera 64 and head 62) to be positioned on a horizontal central axis CC (shown in FIGS. 3-5) of the crane arm 35, as the sections or segments of the camera head 62 are adjustable. Positioning the center of gravity CGP of the payload on the crane arm center line CC reduces or eliminates twisting or torsion of the crane arm 35 during rapid arm movements. Accordingly, the camera can be quickly moved from one position to another, without excessive generation of vibration or resonance in the arm 35. This provides a more stable camera support.

Referring to FIGS. 1 and 2 the counter weight carrier is movable along substantially the entire length of the first section 52. With the crane arm 35 in the retracted position, the counter weight carrier 50 is in front of the center post 36. As the range of movement of the counter weight carrier 50 is increased, in contrast to prior designs, fewer mobile counter weights 58 are needed for balancing. Accordingly, the weight of the entire crane 30 is reduced. This allows for easier transportation and setup. In addition, less force is needed to move the mobile counter weights, reducing the size and weight of the hydraulic system. The crane arm 35 is always maintained in balance, as the center of gravity CG of the arm is fixed. Even when the counter weight carrier 50 moves forward of the center post 46, the crane arm 35 remains balanced, with the CG forward of the tilt axle. Referring to FIG. 9, counterweights 59 may be provided on the top of the counterweight carrier 50, in addition to the sides of the counterweight carrier, to improve balancing characteristics under varying conditions.

The hydraulic system 100, including the hydraulic cylinder 114, and the valve assembly 230 also form a separate inventive subsystem having other uses. This subsystem may be used in other equipment where an actuator applies force over a relatively long distance. In a basic form, the hydraulic system includes a piston slidable within a hydraulic cylinder. A first cable is attached to a first end of the piston and a second cable is attached to a second or opposite end of the piston. The cables extend through the hydraulic cylinder and pass out of the hydraulic cylinder through cable seals. The cable seals allow the cables to slide into and out of the cylinder, while maintaining pressurized hydraulic fluid within the cylinder. The cable seals optionally may also provide a wiping action on the cables, so that the cable sections outside of the cylinder are substantially dry and free of hydraulic oil (even though the sections of the cables within the cylinder are immersed in or surrounded by hydraulic oil). However, the wiping action is not essential. Since the piston can move through substantially the entire length of the cylinder (while pulling the first or second cable with it), a very long actuation length or stroke is provided, in a lightweight and compact design. The first and second cables can optionally be formed as single cable loop. To better provide a seal against the cables sliding through the cable seals 136, the cables 120, 122 may be formed with a smooth outer coating, sheath or jacket (of e.g., plastic) surrounding a core of high strength fibers (of e.g., steel, Nylon, etc.)

The valve assembly 230 also forms a separate inventive subsystem usable as well in other types of equipment and machinery, where precise hydraulic movements are used and with no leakage, even at high pressures.

The crane arm 35 can be more safely used in wet areas and environments, because it can operate entirely on low voltage battery power, or can operate without any electrical power at all. While the hydraulic system advantageously includes a battery and motor, these are low voltage components (typically 12, 24 or 36 VDC). The hydraulic system can also be operated using the hand pump. The accumulator, once charged with hydraulic pressure, can also drive the crane arm 35 through several extension/retraction cycles, without any pumping or external power. The low voltage battery can be periodically recharged when the crane arm 35 is not in use. Alternatively, it can be quickly replaced with a fresh battery, while the crane arm is in use. This avoids the need for connecting 110VAC or 220VAC line current electrical cables to the crane arm (as is often required with existing crane arms). As a result, safety relating to proper equipment grounding or shock hazards are reduced, since the crane arm 35 does not require line current or external grounding. Thus, in wet environments, the ability to operate only on battery power, or hand pump power, is a significant improvement. The need for inverters and transformers associated with use of 110 or 220VAC power, is also avoided. In addition, since external electrical power is not needed, the entire crane and mobile base can operate more freely, as the drag and wheel obstacles created by external electrical cables is avoided. Moreover, the 12, 24 or 36VDC electrical system of the crane 35, if used, is compatible with the electrical power systems of most cameras and remote camera heads.

Figure 26:
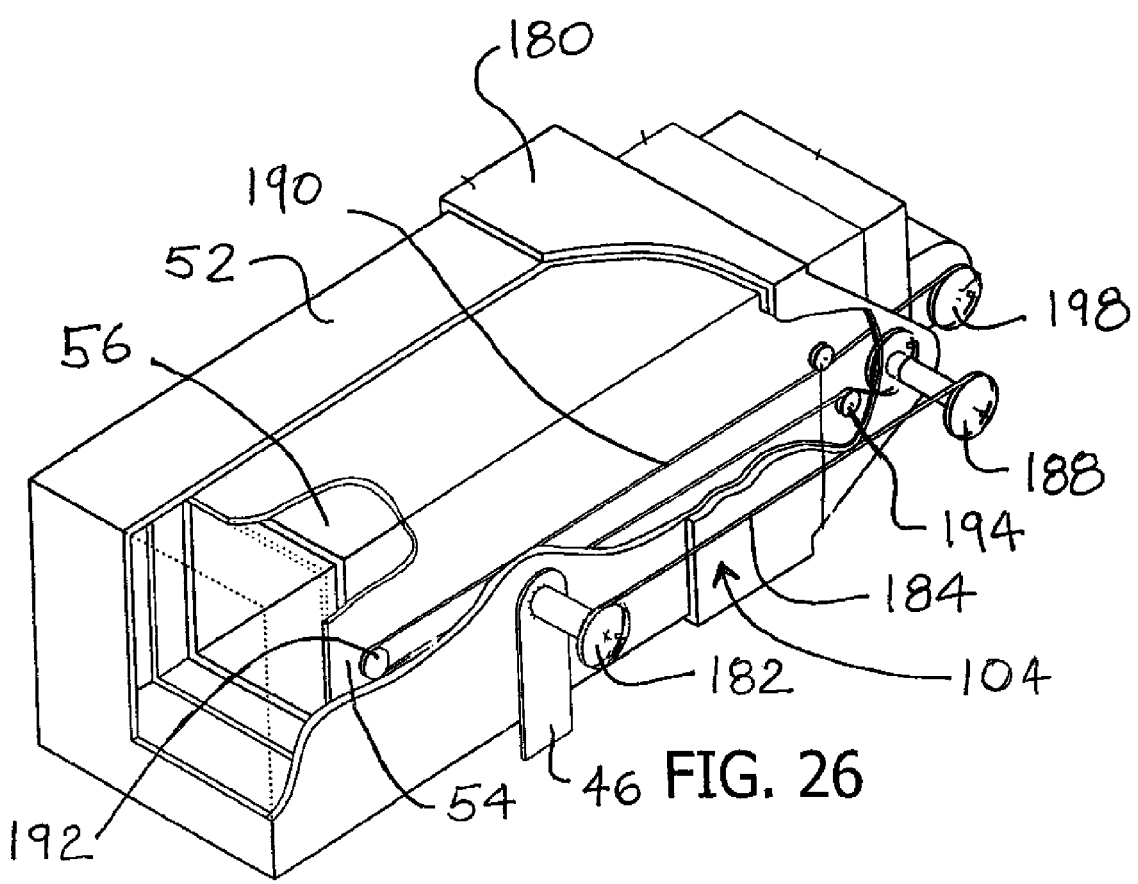
FIG. 26 is a perspective diagram of the leveling system.

FIG. 39 shows an alternative crane arm extension/retraction drive system 300 which can be used instead of the drive system 100 shown primarily in FIGS. 26-28. The drive system 300 has a first or retracting linear actuator 302 and a second or extending linear actuator 304. The actuators 302 and 304 may be hydraulic, electric, pneumatic or use other drive means suitable for moving the counterweight carrier 50. Non-linear actuators for moving the counterweight carrier 50 may also be used, including rotary actuators or winches acting directly to pull on a cable attached to the counterweight carrier 50. In the embodiment shown in FIG. 39, the actuators 302 and 304 are linear hydraulic actuators. While other types of actuators may be used, hydraulic actuators may be advantageous because they are quiet, precisely and relatively easily controlled, compact, reliable, and can be remotely powered via a hydraulic system located away from the actuators themselves. Hydraulic systems are also waterproof.

Referring still to FIG. 39, where the actuators are hydraulic, each of the actuators 302 and 304 has a cylinder 306 attached or fixed in place on the first section 52, and a piston or ram 308 moveable into and out of the cylinder via hydraulic power. The cylinder 306 of the first actuator 302 is attached towards the back end of the first section 52. The cylinder 306 of the second actuator 304 is attached towards the front end of the first section 52.

The first actuator 302 acts as a retraction actuator as it pulls the counterweight carrier forward (to the position shown in solid lines in FIG. 39) which causes the arm to retract, as described above with operation of the drive system 100. The second actuator 304 acts as an extension actuator as it pulls the counterweight carrier 50 rearwardly towards the back of the first section 52 (to the position shown in dotted lines in FIG. 39) which causes the arm to extend.

A retraction actuator pulley 326 is rotatably supported on a clevis at the end of the piston 308 of the first actuator 302.

A retraction cable 324 has a first end 325 fixed or clamped near the front end of the first section 52. The retraction cable 324 runs or extends rearwardly from the first end 325, wraps around the pulley 326, runs forward and wraps around a forward idler pulley 322, then runs rearwardly and is attached to the counterweight carrier 50. The idler pulley 322 is rotatably attached to, and fixed in place on, the top surface of the first section 52, adjacent to the front end of the first section 52. As a result, when the actuator 302 retracts or pulls back, the counterweight carrier 50 is pulled forward, to the position shown in solid lines in FIG. 39. This causes the arm 30 to pull back or retract, as described above relative to operation of the drive system 100.

Symmetrical with retraction components described just above, an extension actuator pulley 310 is rotatably supported on a clevis or other fitting at the end of the piston 308 of the second actuator 304. An extension cable 314 has a first end 315 fixed or clamped near the back end of the first section 52. The extension cable 314 runs or extends forwardly from the first end 315, wraps around the pulley 310, runs rearwardly and wraps around a rear idler pulley 316, then runs forwardly and is attached to the counterweight carrier 50. The idler pulley 316 is rotatably attached to, and fixed in place on, the top surface of the first section 52, adjacent to the back end of the first section 52. As a result, when the actuator 304 retracts (i.e., when the piston 308 is withdrawn into the cylinder 306), the counterweight carrier 50 is pulled rearwardly, towards the back of the first section 52, to the position shown in dotted lines in FIG. 39. This causes the arm 30 to pull extend as described above relative to operation of the drive system 100. Chains and sprockets can alternatively be used in place of pulleys and cables. The term pulley as used here includes sprockets and the term cable as used here includes chains. The term cable here includes flexible elements having a single or multiple strands, wires or fibers.

FIG. 40 shows an alternative embodiment 340 similar or the same as in the Figures described above, and optionally including one or both of a nose plate or camera platform angle stabilizing system 342, and a mechanical stopping position system 400. The cables 184 and 190 which mechanically level the nose plate 65 and camera head 62 are subject to slight stretching/contracting as the arm extends and retracts. This introduces backlash into the leveling system 104 and can cause the nose plate 65 to deviate slightly from level with telescoping movement of the arm. The term backlash here means the characteristics of the levelling system that cause the camera platform to deviate from level, when the arm extends or retracts. Stretching of the cables is the main source of backlash, with smaller amounts of backlash arising from strain of other components, and from other sources. The stabilizing system 342 reduces or prevents this deviation, and helps to maintain the nose plate, and thus the camera, in a level position, during telescoping arm movement.

Figure 41:
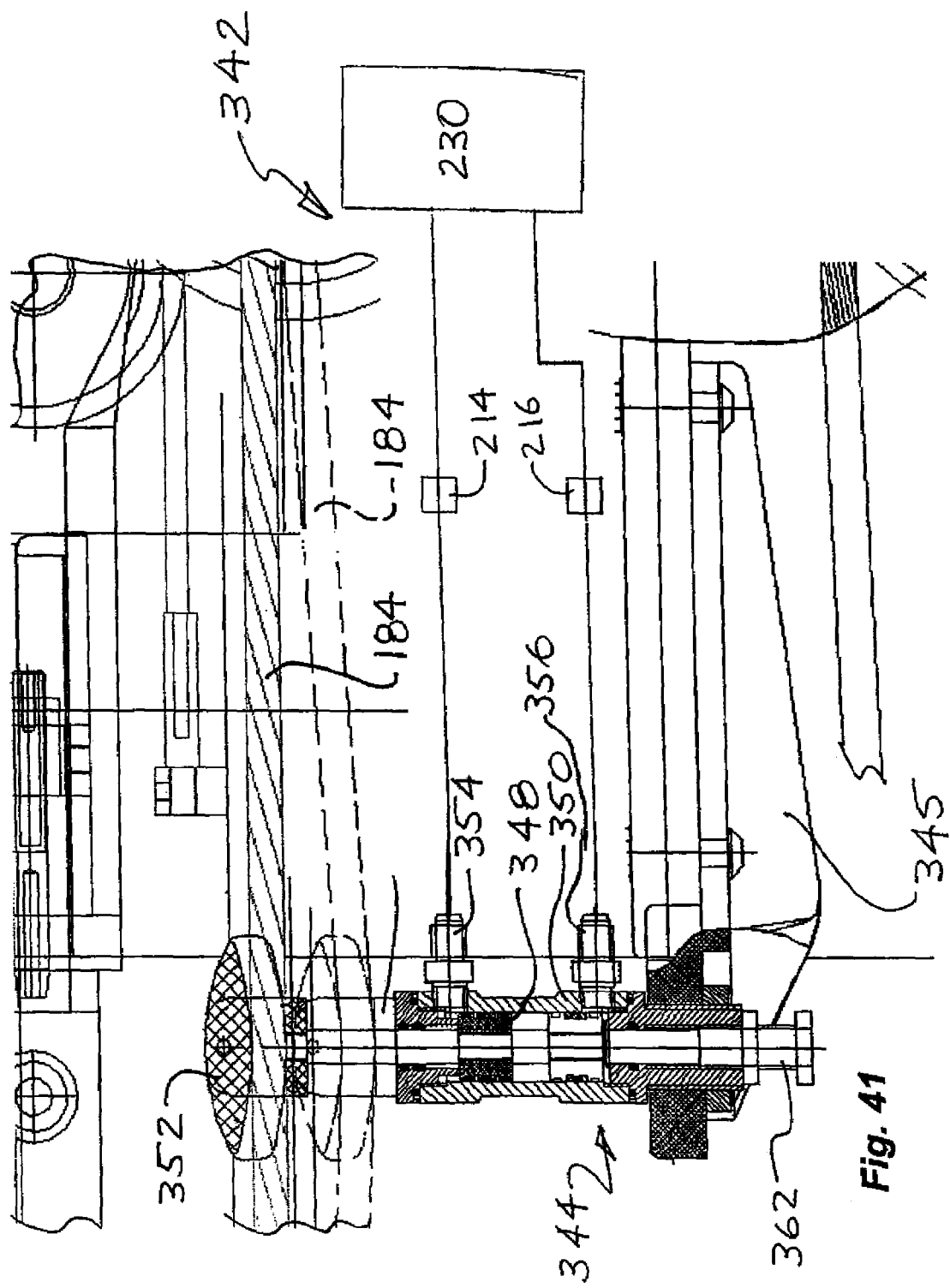
FIG. 41 is a side view of the hydraulic stabilizing actuator shown in FIG. 40.

The stabilizing system 342 is generally symmetrical on both sides of the crane arm shown in FIG. 40. As shown in FIGS. 40 and 41, the stabilizing system 342 includes a cable tensioning assembly 344 attached to each side of the arm on a mounting bracket 345. The cable tensioning assembly 344 on the right side of the arm (shown in FIG. 40) acts on the right side cable 184. The cable tensioning assembly 344 on the left side of the arm (not shown) acts on the left side cable 184. The cable tensioning assemblies or means 344 exert a downward force on the cables 184, when the arm extends. The cables are released when the arm retracts. The position of the cables 184 during extension is shown in dotted lines in FIG. 41. The position of the cables 184 during retraction is shown in solid lines in FIG. 41. The cable tensioning assembly can exert force on the cables in various ways, including via mechanically or electrically driven motors or actuators.

FIG. 41 shows a hydraulically driven cable tensioning assembly 344, suitable for use with a hydraulically driven crane arm. As shown in FIG. 41, a hydraulic cable tensioning assembly 344 has a piston 348 moveable in a cylinder 350. A piston adjuster 362 may be provided to adjust the position of the piston. A cable plate 352 is attached to the piston 348 and is positioned on or around the cable 184. No spring 186 is used. In the stabilizing system 342 as shown in FIG. 41, the ports 354 and 356 are directly connected to the valve assembly 230 or to the hydraulic lines leading to ports 214 and 216. Consequently, the tensioning assembly 344 operates in parallel with and in proportion to hydraulic pressure supplied to the drive system 102 or 300.

Figure 43:
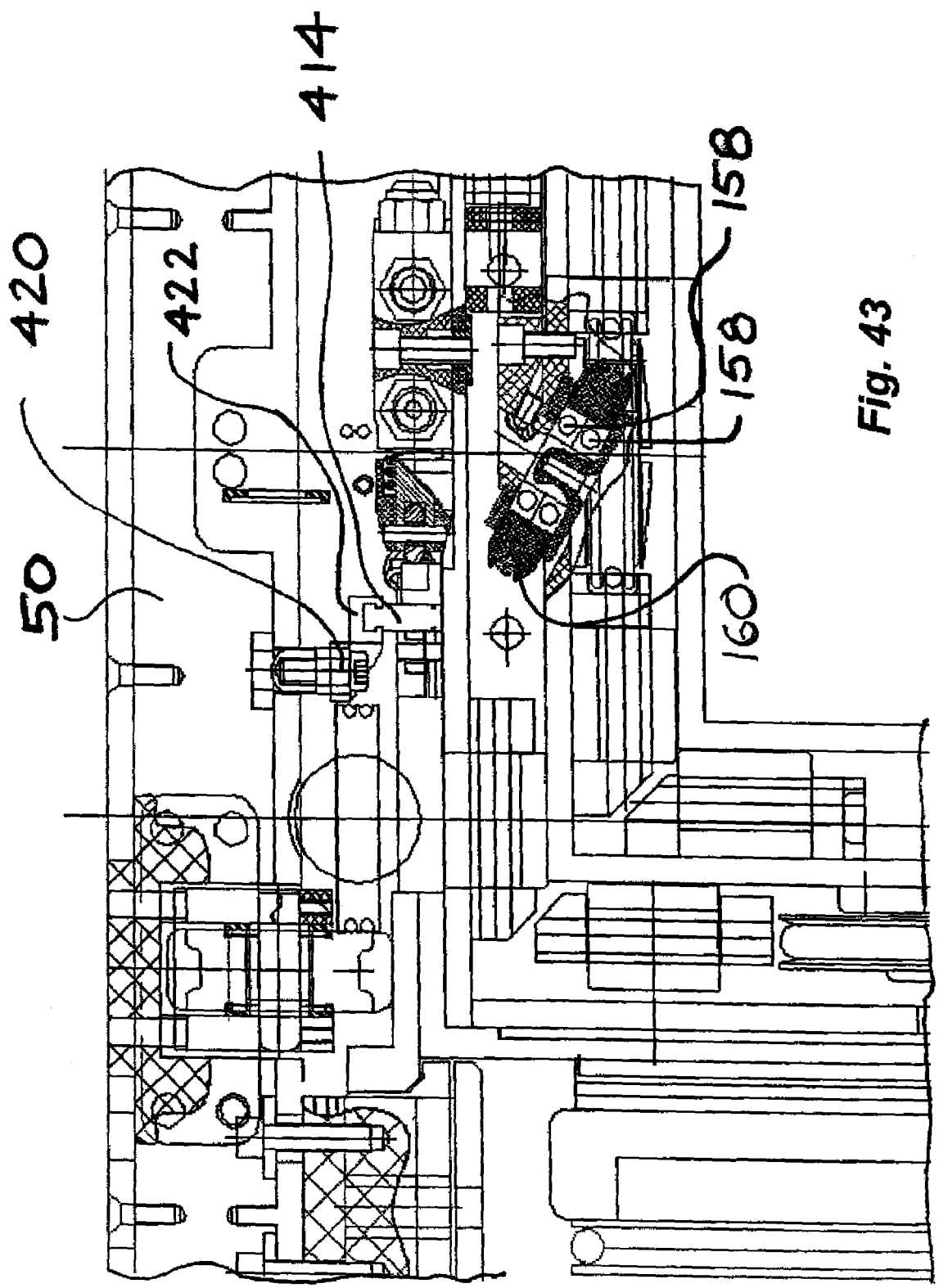
FIG. 43 is a section view taken along line 43-43 of FIG. 42.

In use, as the valve assembly 230 is actuated to extend the arm, fluid flows into the drive system 102 or 300, and also generally simultaneously to the cable tensioning assemblies 344. The piston 348 in each cable tensioning assembly 344 is forced down. This deflects the cable 184 from the position shown in solid lines, to the position shown in dotted lines, in FIG. 41. The amount of deflection needed to maintain the nose plate continuously level will vary depending on the payload, the elastic characteristics of the cables, and other factors. The amount of deflection can be adjusted as desired using the position adjuster 362. The movement profile and timing of the piston 348 can be selected via control of fluid flow to the cylinder 350. By deflecting the cables 184, the cable tensioning assemblies compensate for backlash in the leveling system caused by stretching of the cables when the arm extends. According the nose plate 65 and any camera head 62 and camera 64 remain substantially level at all times. As shown in FIG. 43, to reduce backlash in the drive system, multiple cables 158 may be used, in place of the single cable 158 shown in FIG. 8.

The cable tensioning assemblies hold the cables 184 in the deflected position, until the arm is retracted. During retraction, the flow of hydraulic fluid to the cylinder 350 is reversed, moving the piston back up. The cables 184 return to the original position shown in solid lines in FIG. 41. Typically, the cable tensionings will deflect the cable from about 0.1 to about 0.6 inches, more typically about 0.2-0.4 inches. The stabilization system can also be equivalently designed to deflect the cables 184 up instead of down. If the flow of hydraulic fluid to the cylinder 350 in each cable tensioning assembly 344 is made proportional to the flow of hydraulic fluid to the cylinder 114, 302 or 304, then the action of the cable tensioning assemblies is automatically matched to the extension/retraction movement of the arm.

In an alternative system 360, shown in FIG. 40, a sensor or gyro 390 may optionally be provided on the nose plate 65, camera head 62 or the camera 64, with the sensor 390 linked to an electronic valve controller 374. The link may be wireless or via wires. The sensor 390 senses position relative to gravity and provides a position signal to the electronic valve controller 374. The electronic valve controller controls operation of a cable tensioning valve 385. The valve 385 is connected via hydraulic lines to hydraulic system ports 384 and 386, and to the cylinder 350 of each tensioning assembly 344. The ports 384 and 386 are connected directly to the accumulator 228, and to the return tank or reservoir 226. Consequently, the ports 384 and 386 are always supplied with hydraulic fluid pressure (so long as the accumulator is charged), regardless of the position of the valve assembly 230 (FIG. 30).

The electronic valve controller controls the valve 385 to provide flow of hydraulic fluid to the cable tensioning assemblies 344, which deflect the cables 184 as needed, to maintain the nose plate 65, and hence the camera 64, in a level position. The sensor 390 and control loop to the electronic valve controller 374 may be especially useful when the crane is supported on a moving platform, such as moving land vehicle, or watercraft. Where the platform or vehicle is constantly moving (e.g., the rocking movement of a floating vehicle or platform), the camera 64 may be constantly maintained in a level position, via constant active control of the nose plate position, via the sensor 390 and electronic valve controller 374. With this automatic leveling system, the electronic valve controller 374 can continuously control operation of the cable tensioning assemblies 344, whether the arm is stationary or moving (i.e., extending or retracting). The system 360 operates to keep the camera level, regardless of operation of the drive system 102 or 300.

The stabilizing system 360 also operates independently of the stabilizing system 342. The stabilizing system 342 operates to compensate for backlash inherent in the crane arm components (primarily the stretching of cables). The system 342 generally will be included as part of the crane itself.

The stabilizing system 360 operates whenever the arm changes direction of movement, and provides a predetermined amount of cable deflection. The stabilizing system 360, on the other hand, generally may be included as part of the crane itself, or may also be provided separately as an accessory or add on package. The system 360 operates to compensate for external forces (such as buoyancy, inertia, acceleration, etc.) acting to move the camera platform out of level. When on, the system 360 operates continuously to keep the camera level, regardless of whether the arm is extending, retracting or stopped.

For certain filming sequences, the camera 64 and camera head 62 (if used) may be submerged under water. When submerged, buoyancy forces will change the loads on the crane arm and on the leveling system 104. Use of the sensor 390 and electronic valve controller 374 system allows the leveling system 104 to keep the camera level, regardless of the buoyancy forces present during underwater filming.

As shown in FIGS. 30 and 40, in addition to, or as an alternative to controlling telescoping movement of the crane arm via the control knob 234, a remote control unit 370 may also be provided. The remote control unit 370 is linked to the electronic valve controller 248 via a wired or wireless link 372. A hand control 376, such as a rocker switch, joystick, etc. is used to control the direction and speed of telescoping arm movement. Stop positions may also be selected by adjusting electronic stop positioners 378 on or in the unit 370. Using an arm position signal from the potentiometer 244 and the stop position values selected via stop positioners 378 on the remote control 370, the valve controller 248 actuates the valve 230 so that the arm stops at the selected positions. Accordingly, the limits of telescoping arm movement can be set electronically using the unit 370 and electronic valve controller 374, or by using the mechanical stop position system 400 described below. Of course, stop positions may also be set electronically via the electronic valve controller directly, with or without use of the remote control unit 370.

A mechanical stop position system may be used to temporarily select extended and retracted limits of travel which are less than the total available range inherent in the crane arm. Setting such temporary front and back stop positions may be useful in filming sequences requiring the camera to located at a precise position, moved away, and then returned back to the that position. The mechanical stop position system uses movement of a component of the arm to control the arm drive system, so that telescoping movement of the arm stops at a desired position. The specific drive system (hydraulic, electric, pneumatic, etc.), and the specific moving component of the arm used, may vary with design parameters.

Figure 42:
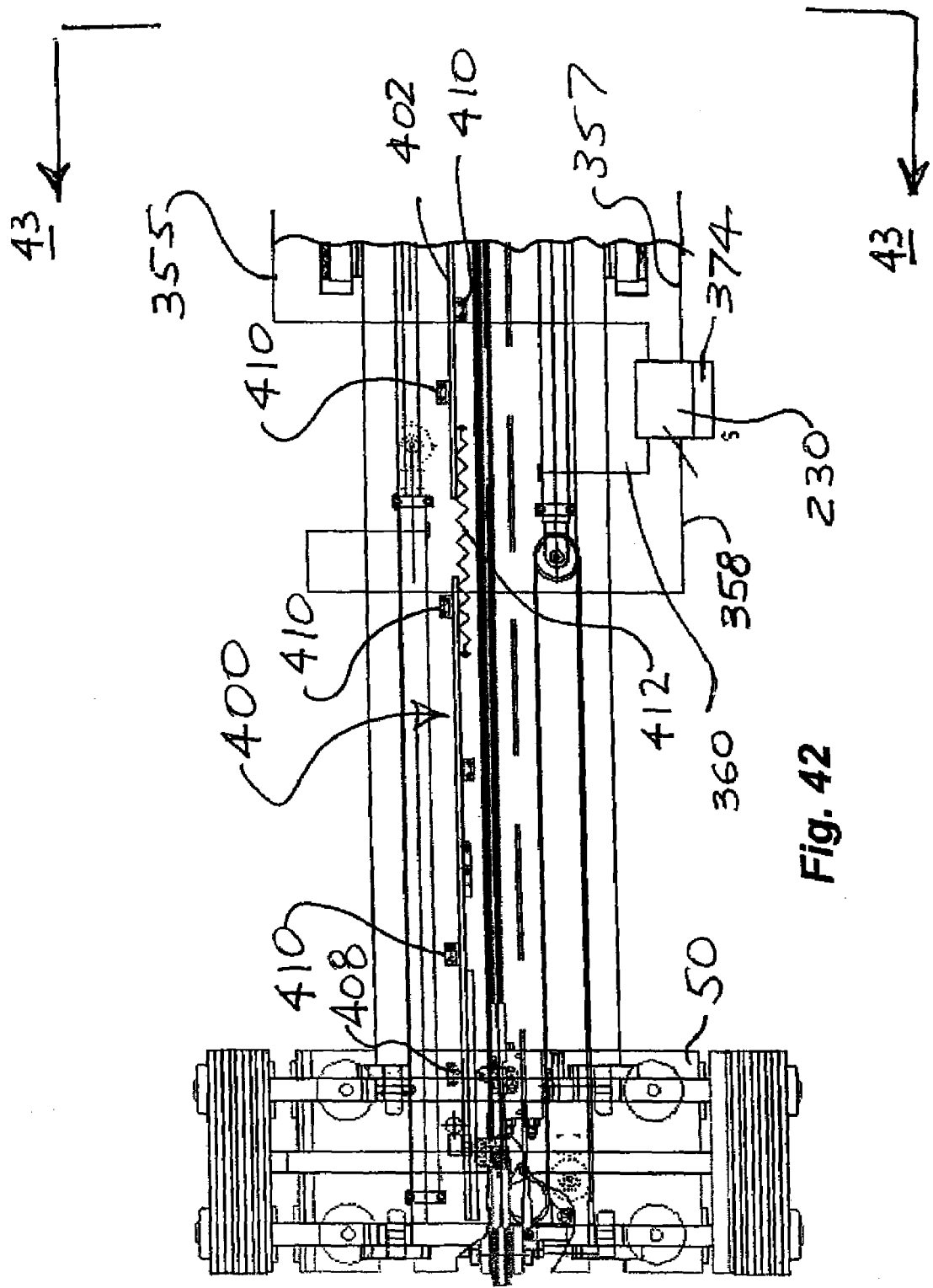
FIG. 42 is a top view of mechanical stopping position system shown in FIG. 40.

FIGS. 40 and 42 show a mechanical stop system 400 that works with a hydraulic drive system such as 102 or 300. The counterweight carrier 50 is selected as the moving arm component which operates the stop system 400. As shown in FIG. 40, the stop system 400 has a front bar or rail 402 supported by supports 410 on the top surface of the first or outer section 52. A cam or angle surface 404 adjacent the front end of the front bar 402 faces a hydraulic stop valve 406. The front bar 402 is moveable in a front/back direction, over a distance sufficient for the cam 404 to operate the stop valve 406. Back up rollers 408 support the back surface of the bars 402 and 414.

Referring still to FIGS. 40 and 42, a rear bar 414 similarly has a rear cam 416 for operating a rear hydraulic stop valve 418. A tension spring 412 connects the front and rear bars. Referring now to FIGS. 40 and 43, a carrier pin 420 extends down from the bottom surface of the counterweight carrier 50. As the carrier 50 moves towards the back of the arm (as the arm telescopically extends outwardly), the carrier pin 420 contacts a pin stop 422 attached on the rear bar 414, moving the rear bar 414 to the rear, against the force of the spring 412. As this occurs, the rear cam 416 moves into engagement with a pin or other component of the rear stop valve 418, gradually closing the valve 418, and stopping telescoping arm movement. The shape of the cam or angle surface 416 is advantageously selected to provide a gradual or feathered stopping movement. This avoids abrupt stopping movements. The pin stop 422 can be secured at any position along the rear bar 414 (e.g., with a thumbscrew, wingnut, etc.) to select the front or extended position stopping position of the arm. Front and rear bar stops 425 limit the rearward and forward movement of the front and rear bars 402 and 414 respectively. The bar stops 425 are positioned to limit bar travel to about 1-4 or 2-3 inches, a dimension comparable to or slightly longer than length of the cam or angle surface 404 or 416.

When the arm is retracted, the carrier pin 420 moves forwardly with the carrier 50. The spring 412 pulls the rear bar forward, disengaging the cam 416 from the stop valve 418, and returning the rear bar 414 to its original position. As the arm continues to retract, a similar stopping operation is performed via the pin 420 acting on the pin stop 422 on the front bar 402.

As shown in FIG. 30, the mechanical stop system 400 operates independently of the electronic valve controller 248 and the valve 230. Consequently, in the event of failure of the electronic valve controller 248, or electrical power failure, the mechanical stop system is unaffected and continues to operate. Some filming sequences may require rapid camera movement to a position close to an actor, or close to moving or dangerous props or equipment. To even more reliably stop the crane arm at a desired position, a stop position can be set via both the electronic stop positioner 378, and the mechanical stop system 400.

Figure 44:
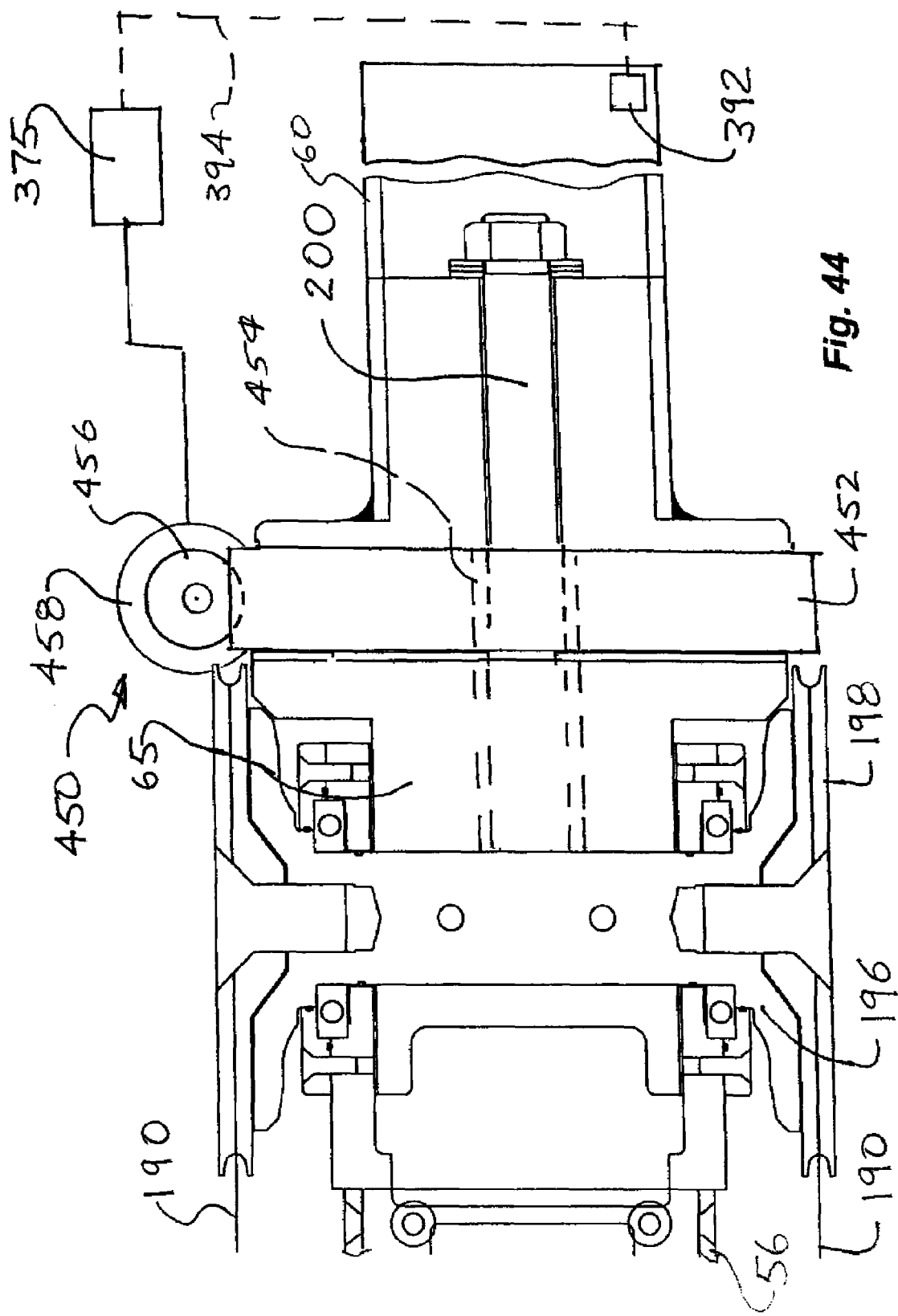
FIG. 44 is a top view of another embodiment having a roll or dutch axis stabilization system.

An optional roll or dutch angle control system 450 is shown in FIG. 44. The extension or riser 60, for example as shown in FIG. 20, is modified to attach to a gear sector plate 452. The plate 452 is pivotably supported on a bearing 454 on the nose plate 65. A worm gear 456 meshes with a gear sector on the plate 452. The gear is driven by a motor 458. A sensor 392 detects the position of the extension or riser 60, and provides a signal to a motor controller 375 (FIG. 44), via a wired or wireless link 394. The motor controller 375 may be included with or part of the electronic valve controller 374 (which will typically be located within the housing or enclosure for the hydraulic system 100, at the back end of the arm). Alternatively, the motor controller 375 may be separately provided (along with the sensor 392 and motor 458) and attached elsewhere on the arm. The motor controller 375 controls the motor 458 to pivot the gear sector plate 452, and hence the extension or riser, and the camera, to maintain a level or zero roll angle. Similar controls may be used to maintain a constant pan angle as well.

Thus, a novel camera crane, hydraulic system, actuator and valve have been shown and described. Changes and substitution may of course he made without departure from the spirit and scope of the invention. The invention, therefore, should not be limited, except to the following claims and their equivalents.

What is claimed is:

1. A camera crane comprising:
   a base supported on wheels;
   a post on the base;
   a telescoping boom arm pivotably supported on the post;
   a camera platform pivotably attached to a front end of the boom arm;
   at least one cable having a first end attached to the post and a second end attached to the camera platform; and
   a camera platform angle stabilizing system including a cable deflecting actuator on the boom arm, and a cable plate driven by the cable deflecting actuator and associated with the cable, with the cable deflecting actuator acting to deflect the cable, to help keep the camera platform level, as the boom arm performs telescoping movement.

2. The camera crane of claim 1 further comprising at least one hydraulic boom arm actuator for driving telescoping movement of the boom arm, a hydraulic system connecting to the hydraulic boom arm actuator, and wherein the cable deflecting actuator comprises a hydraulic deflecting actuator, and the hydraulic system is also connected to the hydraulic deflecting actuator.

3. The camera crane of claim 2 wherein the hydraulic deflecting actuator operates in parallel with and in proportion to hydraulic fluid pressure supplied to the hydraulic boom arm actuator.

4. The camera crane of claim 2 wherein the hydraulic cable deflecting actuator deflects the cable as the boom arm telescopically extends, with the cable returning to an undeflected position as the boom arm retracts.

5. A camera crane comprising:
   a base supported on wheels;
   a post on the base;
   a boom arm including telescoping arm sections, with the boom arm pivotably supported on the post;
   a hydraulic boom arm actuator on the boom arm;
   a hydraulic fluid supply system linked to the hydraulic boom arm actuator;
   a camera platform pivotably attached to a front end of the boom arm;
   at least one post cable having a first end attached on a pulley rigidly attached to the post and a second end attached to a rear leveling axle;
   at least one leveling cable having a first end attached to the rear leveling axle, extending around a rear leveling cable pulley on a telescoping arm section, and having a second end attached to a pulley on the camera platform;
   a camera platform angle stabilizing system including a hydraulic leveling cable deflecting actuator on the boom arm and linked to the hydraulic system, and a cable plate driven by the hydraulic cable deflecting actuator and associated with the leveling cable, with the cable deflecting actuator acting to deflect the leveling cable, to help keep the camera platform level, as the boom arm performs telescoping movement.

6. A telescoping camera crane comprising:
   a first section;
   a counter weight carrier moveable along the first section;
   a second section linked to the counter weight carrier and telescopically extendible out of the first section;
   a third section telescopically extendible from the second section;
   a camera platform supported by the third section;
   an actuator for driving telescopic movement of the second and third sections;
   a camera platform leveling system including at least one cable linked to the camera platform, to keep the camera platform level; and
   a cable tensioning system acting on the at least one cable to compensate for backlash in the leveling system.

7. The telescoping camera crane of claim 6 wherein the actuator comprises a hydraulic actuator driven via a hydraulic system, and where the cable tensioning system includes at least one stabilizer assembly acting to tension the at least one cable, and with the cable tensioning also driven via the hydraulic system.

8. The telescoping camera crane of claim 6 with the camera platform leveling system comprising a first leveling cable connecting to the camera platform, and extending around a leveling roller on the second section and connecting to a leveling axle pivotably supported on the first section, and with a second leveling cable attached to the leveling axle and to the center post, and with the cable tensioning assembly positioned to deflect the second levelling cable.

9. A telescoping camera crane comprising:
   a first section;
   a counter weight carrier moveable along the first section;
   a second section telescopically extendible out of the first section;
   a third section telescopically extendible from the second section;
   a camera platform supported by the third section;
   an actuator for driving telescopic movement of the second and third sections;
   a camera platform leveling system linked to the camera platform, to keep the camera platform level; and
   tensioning means for keeping the camera platform level notwithstanding backlash in the camera platform leveling system.

* * * * *